United States Patent
Wu

(10) Patent No.: US 10,869,108 B1
(45) Date of Patent: Dec. 15, 2020

(54) PARALLEL SIGNAL PROCESSING SYSTEM AND METHOD

(71) Applicant: CALLTROL CORPORATION, Elmsford, NY (US)

(72) Inventor: Wai Wu, Massapequa, NY (US)

(*) Notice: Subject to any disclaimer, the term of this patent is extended or adjusted under 35 U.S.C. 154(b) by 0 days.

(21) Appl. No.: 16/728,881

(22) Filed: Dec. 27, 2019

Related U.S. Application Data

(60) Continuation of application No. 15/823,430, filed on Nov. 27, 2017, now Pat. No. 10,524,024, which is a continuation of application No. 14/305,432, filed on Jun. 16, 2014, now Pat. No. 9,832,543, which is a division of application No. 12/569,456, filed on Sep. 29, 2009, now Pat. No. 8,755,515.

(60) Provisional application No. 61/101,050, filed on Sep. 29, 2008.

(51) Int. Cl.
*H04Q 3/545* (2006.01)
*H04M 11/06* (2006.01)
*H04M 11/00* (2006.01)
*H04M 5/00* (2006.01)

(52) U.S. Cl.
CPC ......... *H04Q 3/545* (2013.01); *H04M 5/00* (2013.01); *H04M 11/007* (2013.01); *H04M 11/066* (2013.01)

(58) Field of Classification Search
CPC combination set(s) only.
See application file for complete search history.

(56) References Cited

U.S. PATENT DOCUMENTS

| | | |
|---|---|---|
| 4,507,748 A | 3/1985 | Cotton |
| 4,591,981 A | 5/1986 | Kassabov |
| 4,665,556 A | 5/1987 | Fukushima et al. |
| 4,742,552 A | 5/1988 | Andrews |
| 4,783,738 A | 11/1988 | Li et al. |
| 4,851,995 A | 7/1989 | Hsu et al. |
| 4,860,201 A | 8/1989 | Stolfo et al. |
| 4,873,626 A | 10/1989 | Gifford |
| 4,891,787 A | 1/1990 | Gifford |
| 4,964,126 A | 10/1990 | Musicus et al. |
| 4,972,314 A | 11/1990 | Getzinger et al. |

(Continued)

OTHER PUBLICATIONS

Whalen, Sean. "Audio and the graphics processing unit." Author report, University of California Davis 47 (2005): 51.

(Continued)

*Primary Examiner* — Duc Nguyen
*Assistant Examiner* — Assad Mohammed
(74) *Attorney, Agent, or Firm* — Hoffberg & Associates; Steven M. Hoffberg

(57) ABSTRACT

A system and method for processing a plurality of channels, for example audio channels, in parallel is provided. For example, a plurality of telephony channels are processed in order to detect and respond to call progress tones. The channels may be processed according to a common transform algorithm. Advantageously, a massively parallel architecture is employed, in which operations on many channels are synchronized, to achieve a high efficiency parallel processing environment. The parallel processor may be situated on a data bus, separate from a main general-purpose processor, or integrated with the processor in a common board or integrated device. All, or a portion of a speech processing algorithm may also be performed in a massively parallel manner.

20 Claims, 3 Drawing Sheets

(56) References Cited

U.S. PATENT DOCUMENTS

| | | |
|---|---|---|
| 4,985,832 A | 1/1991 | Grondalski |
| 5,006,721 A | 4/1991 | Cameron et al. |
| 5,038,282 A | 8/1991 | Gilbert et al. |
| 5,050,065 A | 9/1991 | Dartois et al. |
| 5,091,783 A | 2/1992 | Miyaguchi |
| 5,091,786 A | 2/1992 | Miyaguchi |
| 5,093,722 A | 3/1992 | Miyaguchi et al. |
| 5,105,387 A | 4/1992 | Childers et al. |
| 5,121,498 A | 6/1992 | Gilbert et al. |
| 5,146,606 A | 9/1992 | Grondalski |
| 5,153,521 A | 10/1992 | Grondalski |
| 5,163,120 A | 11/1992 | Childers et al. |
| 5,164,990 A | 11/1992 | Pazienti et al. |
| 5,165,023 A | 11/1992 | Gifford |
| 5,170,484 A | 12/1992 | Grondalski |
| 5,175,862 A | 12/1992 | Phelps et al. |
| 5,187,795 A | 2/1993 | Balmforth et al. |
| 5,197,130 A | 3/1993 | Chen et al. |
| 5,197,140 A | 3/1993 | Balmer |
| 5,210,705 A | 5/1993 | Chauvel et al. |
| 5,210,836 A | 5/1993 | Childers et al. |
| 5,212,777 A | 5/1993 | Gove et al. |
| 5,226,125 A | 7/1993 | Balmer et al. |
| 5,230,079 A | 7/1993 | Grondalski |
| 5,239,654 A | 8/1993 | Ing-Simmons et al. |
| 5,251,097 A | 10/1993 | Simmons et al. |
| 5,265,207 A | 11/1993 | Zak et al. |
| 5,268,856 A | 12/1993 | Wilson |
| 5,276,895 A | 1/1994 | Grondalski |
| 5,289,577 A | 2/1994 | Gonzales et al. |
| 5,293,637 A | 3/1994 | Childers et al. |
| 5,305,462 A | 4/1994 | Grondalski |
| 5,309,232 A | 5/1994 | Hartung et al. |
| 5,321,510 A | 6/1994 | Childers et al. |
| 5,327,541 A | 7/1994 | Reinecke et al. |
| 5,333,268 A | 7/1994 | Douglas et al. |
| 5,339,447 A | 8/1994 | Balmer |
| 5,349,527 A | 9/1994 | Pieprzak et al. |
| 5,353,412 A | 10/1994 | Douglas et al. |
| 5,361,363 A | 11/1994 | Wells et al. |
| 5,371,896 A | 12/1994 | Gove et al. |
| 5,388,214 A | 2/1995 | Leiserson et al. |
| 5,390,298 A | 2/1995 | Kuszmaul et al. |
| 5,408,673 A | 4/1995 | Childers et al. |
| 5,410,649 A | 4/1995 | Gove |
| 5,418,970 A | 5/1995 | Gifford |
| 5,420,809 A | 5/1995 | Read et al. |
| 5,430,854 A | 7/1995 | Sprague et al. |
| 5,442,581 A | 8/1995 | Poland |
| 5,446,651 A | 8/1995 | Moyse et al. |
| 5,452,425 A | 9/1995 | Childers et al. |
| 5,465,095 A | 11/1995 | Bryant |
| 5,465,224 A | 11/1995 | Guttag et al. |
| 5,471,592 A | 11/1995 | Gove et al. |
| 5,479,166 A | 12/1995 | Read et al. |
| 5,481,308 A | 1/1996 | Hartung et al. |
| 5,481,749 A | 1/1996 | Grondalski |
| 5,485,411 A | 1/1996 | Guttag et al. |
| 5,493,513 A | 2/1996 | Keith et al. |
| 5,493,514 A | 2/1996 | Keith et al. |
| 5,493,524 A | 2/1996 | Guttag et al. |
| 5,499,375 A | 3/1996 | Miyaguchi |
| 5,504,678 A | 4/1996 | Juszczak et al. |
| 5,509,129 A | 4/1996 | Guttag et al. |
| 5,511,212 A | 4/1996 | Rockoff |
| 5,512,896 A | 4/1996 | Read et al. |
| 5,513,371 A | 4/1996 | Cypher et al. |
| 5,522,080 A | 5/1996 | Harney |
| 5,522,083 A | 5/1996 | Gove et al. |
| 5,528,238 A | 6/1996 | Nickerson |
| 5,530,661 A | 6/1996 | Garbe et al. |
| 5,530,809 A | 6/1996 | Douglas et al. |
| 5,532,940 A | 7/1996 | Agarwal et al. |
| 5,535,138 A | 7/1996 | Keith |
| 5,535,288 A | 7/1996 | Chen et al. |
| 5,537,338 A | 7/1996 | Coelho |
| 5,539,662 A | 7/1996 | Nickerson |
| 5,539,663 A | 7/1996 | Agarwal |
| 5,539,891 A | 7/1996 | Childers et al. |
| 5,555,428 A | 9/1996 | Radigan et al. |
| 5,559,722 A | 9/1996 | Nickerson |
| 5,561,784 A | 10/1996 | Chen et al. |
| 5,568,192 A | 10/1996 | Hannah |
| 5,577,262 A | 11/1996 | Pechanek et al. |
| 5,579,527 A | 11/1996 | Chin et al. |
| 5,581,778 A | 12/1996 | Chin et al. |
| 5,586,026 A | 12/1996 | Highnam et al. |
| 5,588,152 A | 12/1996 | Dapp et al. |
| 5,590,283 A | 12/1996 | Hillis et al. |
| 5,590,345 A | 12/1996 | Barker et al. |
| 5,590,350 A | 12/1996 | Guttag et al. |
| 5,590,356 A | 12/1996 | Gilbert |
| 5,592,405 A | 1/1997 | Gove et al. |
| 5,594,679 A | 1/1997 | Iwata |
| 5,594,918 A | 1/1997 | Knowles et al. |
| 5,596,519 A | 1/1997 | Van Aken et al. |
| 5,596,660 A | 1/1997 | Shu |
| 5,596,763 A | 1/1997 | Guttag et al. |
| 5,598,545 A | 1/1997 | Childers et al. |
| 5,600,582 A | 2/1997 | Miyaguchi |
| 5,600,847 A | 2/1997 | Guttag et al. |
| 5,603,013 A | 2/1997 | Ohara |
| 5,606,520 A | 2/1997 | Gove et al. |
| 5,606,677 A | 2/1997 | Balmer et al. |
| 5,611,038 A | 3/1997 | Shaw et al. |
| 5,612,908 A | 3/1997 | Pechanek et al. |
| 5,613,146 A | 3/1997 | Gove et al. |
| 5,625,836 A | 4/1997 | Barker et al. |
| 5,628,025 A | 5/1997 | Chung et al. |
| 5,634,065 A | 5/1997 | Guttag et al. |
| 5,634,067 A | 5/1997 | Nagazumi |
| 5,640,578 A | 6/1997 | Balmer et al. |
| 5,644,522 A | 7/1997 | Moyse et al. |
| 5,644,524 A | 7/1997 | Van Aken et al. |
| 5,659,780 A | 8/1997 | Wu |
| 5,664,214 A | 9/1997 | Taylor et al. |
| 5,669,010 A | 9/1997 | Duluk, Jr. |
| 5,680,339 A | 10/1997 | Moyse et al. |
| 5,680,550 A | 10/1997 | Kuszmaul et al. |
| 5,680,600 A | 10/1997 | Childers et al. |
| 5,682,491 A | 10/1997 | Pechanek et al. |
| 5,689,677 A | 11/1997 | MacMillan |
| 5,689,695 A | 11/1997 | Read |
| 5,694,348 A | 12/1997 | Guttag et al. |
| 5,694,588 A | 12/1997 | Ohara et al. |
| 5,696,913 A | 12/1997 | Gove et al. |
| 5,696,954 A | 12/1997 | Guttag et al. |
| 5,696,959 A | 12/1997 | Guttag et al. |
| 5,708,836 A | 1/1998 | Wilkinson et al. |
| 5,710,935 A | 1/1998 | Barker et al. |
| 5,712,999 A | 1/1998 | Guttag et al. |
| 5,713,037 A | 1/1998 | Wilkinson et al. |
| 5,717,943 A | 2/1998 | Barker et al. |
| 5,717,944 A | 2/1998 | Wilkinson et al. |
| 5,727,225 A | 3/1998 | Guttag et al. |
| 5,729,691 A | 3/1998 | Agarwal |
| 5,734,880 A | 3/1998 | Guttag et al. |
| 5,734,921 A | 3/1998 | Dapp et al. |
| 5,742,538 A | 4/1998 | Guttag et al. |
| 5,752,067 A | 5/1998 | Wilkinson et al. |
| 5,752,068 A | 5/1998 | Gilbert |
| 5,752,071 A | 5/1998 | Tubbs et al. |
| 5,754,871 A | 5/1998 | Wilkinson et al. |
| 5,758,195 A | 5/1998 | Balmer |
| 5,761,523 A | 6/1998 | Wilkinson et al. |
| 5,761,726 A | 6/1998 | Guttag et al. |
| 5,765,010 A | 6/1998 | Chung et al. |
| 5,765,011 A | 6/1998 | Wilkinson et al. |
| 5,768,445 A | 6/1998 | Troeller et al. |
| 5,768,609 A | 6/1998 | Gove et al. |
| 5,774,357 A | 6/1998 | Hoffberg et al. |
| 5,778,241 A | 7/1998 | Bindloss et al. |
| 5,784,636 A | 7/1998 | Rupp |
| 5,794,059 A | 8/1998 | Barker et al. |

(56) References Cited

U.S. PATENT DOCUMENTS

| | | |
|---|---|---|
| 5,805,913 A | 9/1998 | Guttag et al. |
| 5,809,288 A | 9/1998 | Balmer |
| 5,809,292 A | 9/1998 | Wilkinson et al. |
| 5,815,680 A | 9/1998 | Okumura et al. |
| 5,815,723 A | 9/1998 | Wilkinson et al. |
| 5,822,606 A | 10/1998 | Morton |
| 5,825,677 A | 10/1998 | Agarwal et al. |
| 5,828,894 A | 10/1998 | Wilkinson et al. |
| 5,842,031 A | 11/1998 | Barker et al. |
| 5,867,386 A | 2/1999 | Hoffberg et al. |
| 5,867,649 A | 2/1999 | Larson |
| 5,867,723 A | 2/1999 | Chin et al. |
| 5,870,619 A | 2/1999 | Wilkinson et al. |
| 5,872,965 A | 2/1999 | Petrick |
| 5,872,987 A | 2/1999 | Wade et al. |
| 5,875,108 A | 2/1999 | Hoffberg et al. |
| 5,878,241 A | 3/1999 | Wilkinson et al. |
| 5,881,272 A | 3/1999 | Balmer |
| 5,901,246 A | 5/1999 | Hoffberg et al. |
| 5,903,454 A | 5/1999 | Hoffberg et al. |
| 5,907,822 A | 5/1999 | Prieto, Jr. |
| 5,909,559 A | 6/1999 | So |
| 5,920,477 A | 7/1999 | Hoffberg et al. |
| 5,930,390 A | 7/1999 | Coelho |
| 5,933,624 A | 8/1999 | Balmer |
| 5,937,202 A | 8/1999 | Crosetto |
| 5,951,677 A | 9/1999 | Wolf et al. |
| 5,960,193 A | 9/1999 | Guttag et al. |
| 5,960,211 A | 9/1999 | Schwartz et al. |
| 5,961,635 A | 10/1999 | Guttag et al. |
| 5,963,745 A | 10/1999 | Collins et al. |
| 5,963,746 A | 10/1999 | Barker et al. |
| 5,966,528 A | 10/1999 | Wilkinson et al. |
| 5,974,539 A | 10/1999 | Guttag et al. |
| 5,978,509 A | 11/1999 | Nachtergaele et al. |
| 5,983,161 A | 11/1999 | Lemelson et al. |
| 5,987,590 A | 11/1999 | Wing So |
| 5,995,747 A | 11/1999 | Guttag et al. |
| 5,995,748 A | 11/1999 | Guttag et al. |
| 6,016,538 A | 1/2000 | Guttag et al. |
| 6,026,478 A | 2/2000 | Dowling |
| 6,026,484 A | 2/2000 | Golston |
| 6,032,170 A | 2/2000 | Guttag et al. |
| 6,037,982 A | 3/2000 | Coelho |
| 6,038,584 A | 3/2000 | Balmer |
| 6,047,122 A | 4/2000 | Spiller |
| 6,052,773 A | 4/2000 | DeHon et al. |
| 6,055,619 A | 4/2000 | North et al. |
| 6,058,473 A | 5/2000 | Guttag et al. |
| 6,067,613 A | 5/2000 | Balmer |
| 6,070,003 A | 5/2000 | Gove et al. |
| 6,078,745 A | 6/2000 | De Greef et al. |
| 6,079,008 A | 6/2000 | Clery, III |
| 6,081,750 A | 6/2000 | Hoffberg et al. |
| 6,088,062 A | 7/2000 | Kanou et al. |
| 6,088,782 A | 7/2000 | Lee et al. |
| 6,088,783 A | 7/2000 | Morton |
| 6,091,857 A | 7/2000 | Shaw et al. |
| 6,094,715 A | 7/2000 | Wilkinson et al. |
| 6,098,163 A | 8/2000 | Guttag et al. |
| 6,101,592 A | 8/2000 | Pechanek et al. |
| 6,105,119 A | 8/2000 | Kerr et al. |
| 6,113,650 A | 9/2000 | Sakai |
| 6,116,768 A | 9/2000 | Guttag et al. |
| 6,121,998 A | 9/2000 | Voois et al. |
| 6,122,767 A | 9/2000 | Ohara |
| 6,124,882 A | 9/2000 | Voois et al. |
| 6,141,744 A | 10/2000 | Wing So |
| 6,148,111 A | 11/2000 | Creusere |
| 6,148,389 A | 11/2000 | So |
| 6,167,502 A | 12/2000 | Pechanek et al. |
| 6,170,048 B1 | 1/2001 | Wing So |
| 6,170,049 B1 | 1/2001 | So |
| 6,173,305 B1 | 1/2001 | Poland |
| 6,173,388 B1 | 1/2001 | Abercrombie et al. |
| 6,173,389 B1 | 1/2001 | Pechanek et al. |
| 6,173,394 B1 | 1/2001 | Guttag et al. |
| 6,179,489 B1 | 1/2001 | So et al. |
| 6,182,216 B1 | 1/2001 | Luyster |
| 6,188,803 B1 | 2/2001 | Iwase et al. |
| 6,199,162 B1 | 3/2001 | Luyster |
| 6,205,533 B1 | 3/2001 | Margolus |
| 6,209,114 B1 | 3/2001 | Wolf et al. |
| 6,212,628 B1 | 4/2001 | Abercrombie et al. |
| 6,216,223 B1 | 4/2001 | Revilla et al. |
| 6,219,688 B1 | 4/2001 | Guttag et al. |
| 6,219,775 B1 | 4/2001 | Wade et al. |
| 6,223,274 B1 | 4/2001 | Catthoor et al. |
| 6,226,389 B1 | 5/2001 | Lemelson et al. |
| 6,226,738 B1 | 5/2001 | Dowling |
| 6,240,437 B1 | 5/2001 | Guttag et al. |
| 6,243,730 B1 | 6/2001 | Wang |
| 6,260,088 B1 | 7/2001 | Gove et al. |
| 6,272,479 B1 | 8/2001 | Farry et al. |
| 6,272,512 B1 | 8/2001 | Golliver et al. |
| 6,275,239 B1 | 8/2001 | Ezer et al. |
| 6,275,773 B1 | 8/2001 | Lemelson et al. |
| 6,275,920 B1 | 8/2001 | Abercrombie et al. |
| 6,282,556 B1 | 8/2001 | Chehrazi et al. |
| 6,298,370 B1 | 10/2001 | Tang et al. |
| 6,304,197 B1 | 10/2001 | Freking et al. |
| 6,311,280 B1 | 10/2001 | Vishin |
| 6,317,159 B1 | 11/2001 | Aoyama |
| 6,317,767 B2 | 11/2001 | Wang |
| 6,317,819 B1 | 11/2001 | Morton |
| 6,321,322 B1 | 11/2001 | Pechanek et al. |
| 6,353,460 B1 | 3/2002 | Sokawa et al. |
| 6,353,843 B1 | 3/2002 | Chehrazi et al. |
| 6,356,994 B1 | 3/2002 | Barry et al. |
| 6,366,999 B1 | 4/2002 | Drabenstott et al. |
| 6,370,558 B1 | 4/2002 | Guttag et al. |
| 6,397,324 B1 | 5/2002 | Barry et al. |
| 6,400,996 B1 | 6/2002 | Hoffberg et al. |
| 6,404,928 B1 | 6/2002 | Shaw et al. |
| 6,405,185 B1 | 6/2002 | Pechanek et al. |
| 6,408,382 B1 | 6/2002 | Pechanek et al. |
| 6,418,424 B1 | 7/2002 | Hoffberg et al. |
| 6,421,696 B1 | 7/2002 | Horton |
| 6,421,809 B1 | 7/2002 | Wuytack et al. |
| 6,425,054 B1 | 7/2002 | Nguyen |
| 6,430,287 B1 | 8/2002 | Rao |
| 6,430,589 B1 | 8/2002 | Jennings, III |
| 6,438,569 B1 | 8/2002 | Abbott |
| 6,446,190 B1 | 9/2002 | Barry et al. |
| 6,448,910 B1 | 9/2002 | Lu |
| 6,449,378 B1 | 9/2002 | Yoshida et al. |
| 6,449,667 B1 | 9/2002 | Ganmukhi et al. |
| 6,449,747 B2 | 9/2002 | Wuytack et al. |
| 6,467,036 B1 | 10/2002 | Pechanek et al. |
| 6,470,380 B1 | 10/2002 | Yoshizawa et al. |
| 6,470,441 B1 | 10/2002 | Pechanek et al. |
| 6,487,500 B2 | 11/2002 | Lemelson et al. |
| 6,493,467 B1 | 12/2002 | Okuda et al. |
| 6,502,117 B2 | 12/2002 | Golliver et al. |
| 6,512,852 B1 | 1/2003 | Wu et al. |
| 6,526,430 B1 | 2/2003 | Hung et al. |
| 6,530,010 B1 | 3/2003 | Hung et al. |
| 6,553,130 B1 | 4/2003 | Lemelson et al. |
| 6,557,094 B2 | 4/2003 | Pechanek et al. |
| 6,560,742 B1 | 5/2003 | Dubey et al. |
| 6,573,907 B1 | 6/2003 | Madrane |
| 6,577,764 B2 | 6/2003 | Myler et al. |
| 6,578,150 B2 | 6/2003 | Luyster |
| 6,581,152 B2 | 6/2003 | Barry et al. |
| 6,608,296 B1 | 8/2003 | Toyoda et al. |
| 6,621,855 B1 | 9/2003 | Van Stralen et al. |
| 6,622,234 B1 | 9/2003 | Pechanek et al. |
| 6,630,964 B2 | 10/2003 | Burns et al. |
| 6,631,457 B1 | 10/2003 | Ohba |
| 6,638,226 B2 | 10/2003 | He et al. |
| 6,640,145 B2 | 10/2003 | Hoffberg et al. |
| 6,647,486 B2 | 11/2003 | Ohba |
| 6,654,870 B1 | 11/2003 | Barry et al. |
| 6,665,790 B1 | 12/2003 | Glossner, III et al. |

(56) References Cited

U.S. PATENT DOCUMENTS

| | | |
|---|---|---|
| 6,671,797 B1 | 12/2003 | Golston |
| 6,675,286 B1 | 1/2004 | Sun et al. |
| 6,681,052 B2 | 1/2004 | Luna et al. |
| 6,708,246 B1 | 3/2004 | Ishihara et al. |
| 6,714,197 B1 | 3/2004 | Thekkath et al. |
| 6,721,773 B2 | 4/2004 | Jennings, III |
| 6,728,862 B1 | 4/2004 | Wilson |
| 6,732,259 B1 | 5/2004 | Thekkath et al. |
| 6,732,354 B2 | 5/2004 | Ebeling et al. |
| 6,738,358 B2 | 5/2004 | Bist et al. |
| 6,738,522 B1 | 5/2004 | Hsu et al. |
| 6,742,010 B1 | 5/2004 | Hus et al. |
| 6,745,315 B2 | 6/2004 | Gurney et al. |
| 6,748,517 B1 | 6/2004 | Pechanek et al. |
| 6,751,319 B2 | 6/2004 | Luyster |
| 6,754,279 B2 | 6/2004 | Zhou et al. |
| 6,754,687 B1 | 6/2004 | Kurak, Jr. et al. |
| 6,757,329 B2 | 6/2004 | Morad et al. |
| 6,760,831 B2 | 7/2004 | Drabenstott et al. |
| 6,760,833 B1 | 7/2004 | Dowling |
| 6,765,625 B1 | 7/2004 | Lee et al. |
| 6,769,056 B2 | 7/2004 | Barry et al. |
| 6,772,186 B1 | 8/2004 | Tonomura et al. |
| 6,775,766 B2 | 8/2004 | Revilla et al. |
| 6,785,743 B1 | 8/2004 | Sun et al. |
| 6,791,609 B2 | 9/2004 | Yamauchi et al. |
| 6,825,857 B2 | 11/2004 | Harasimiuk |
| 6,826,522 B1 | 11/2004 | Moller et al. |
| 6,829,016 B2 | 12/2004 | Hung |
| 6,832,232 B1 | 12/2004 | Hus et al. |
| 6,836,289 B2 | 12/2004 | Koshiba et al. |
| 6,839,728 B2 | 1/2005 | Pitsianis et al. |
| 6,845,423 B2 | 1/2005 | Park |
| 6,847,313 B2 | 1/2005 | Biswas |
| 6,848,041 B2 | 1/2005 | Pechanek et al. |
| 6,850,252 B1 | 2/2005 | Hoffberg |
| 6,851,041 B2 | 2/2005 | Pechanek et al. |
| 6,854,003 B2 | 2/2005 | Jennings, III |
| 6,868,490 B1 | 3/2005 | Barry et al. |
| 6,873,658 B2 | 3/2005 | Zhou |
| 6,882,976 B1 | 4/2005 | Hsu et al. |
| 6,898,691 B2 | 5/2005 | Blomgren et al. |
| 6,901,421 B2 | 5/2005 | Nielsen et al. |
| 6,906,639 B2 | 6/2005 | Lemelson et al. |
| 6,907,438 B1 | 6/2005 | Horton et al. |
| 6,922,716 B2 | 7/2005 | Desai et al. |
| 6,930,689 B1 | 8/2005 | Giacalone et al. |
| 6,933,970 B2 | 8/2005 | Koshiba et al. |
| 6,948,050 B1 | 9/2005 | Gove et al. |
| 6,950,547 B2 | 9/2005 | Floeder et al. |
| 6,954,842 B2 | 10/2005 | Drabenstott et al. |
| 6,957,317 B2 | 10/2005 | Chen et al. |
| 6,959,372 B1 | 10/2005 | Hobson et al. |
| 6,961,084 B1 | 11/2005 | Duncan et al. |
| 6,963,649 B2 | 11/2005 | Vaudrey et al. |
| 6,970,196 B1 | 11/2005 | Ishikawa et al. |
| 6,970,994 B2 | 11/2005 | Abdallah et al. |
| 6,973,469 B1 | 12/2005 | Hsu et al. |
| 6,976,046 B2 | 12/2005 | Guevorkian et al. |
| 6,996,117 B2 | 2/2006 | Lee et al. |
| 6,999,520 B2 | 2/2006 | Reina |
| 7,003,093 B2 | 2/2006 | Prabhu et al. |
| 7,003,450 B2 | 2/2006 | Sadri et al. |
| 7,003,653 B2 | 2/2006 | Spracklen |
| 7,006,881 B1 | 2/2006 | Hoffberg et al. |
| 7,007,002 B2 | 2/2006 | Matsugu et al. |
| 7,007,055 B2 | 2/2006 | Zheltov et al. |
| 7,010,668 B2 | 3/2006 | Drabenstott et al. |
| 7,020,873 B2 | 3/2006 | Bik et al. |
| 7,024,540 B2 | 4/2006 | Barry et al. |
| 7,032,215 B2 | 4/2006 | Harrison, III et al. |
| 7,035,991 B2 | 4/2006 | Ohba |
| 7,043,006 B1 | 5/2006 | Chambers et al. |
| 7,043,682 B1 | 5/2006 | Ferguson |
| 7,054,850 B2 | 5/2006 | Matsugu |
| 7,070,398 B2 | 7/2006 | Olsen et al. |
| 7,072,357 B2 * | 7/2006 | Stacey ............... G06F 15/8007 370/465 |
| 7,072,929 B2 | 7/2006 | Pechanek et al. |
| 7,085,749 B2 | 8/2006 | Matsugu |
| 7,085,795 B2 | 8/2006 | Debes et al. |
| 7,106,795 B2 | 9/2006 | Kerofsky |
| 7,110,431 B2 | 9/2006 | Oates |
| 7,110,437 B2 | 9/2006 | Oates et al. |
| 7,110,440 B2 | 9/2006 | Oates et al. |
| 7,123,655 B2 | 10/2006 | Kerofsky |
| 7,127,590 B1 | 10/2006 | Lindquist |
| 7,130,348 B2 | 10/2006 | Kerofsky |
| 7,136,710 B1 | 11/2006 | Hoffberg et al. |
| 7,142,603 B2 | 11/2006 | Luna et al. |
| 7,143,264 B2 | 11/2006 | Debes et al. |
| 7,145,487 B1 | 12/2006 | Anderson et al. |
| 7,146,487 B2 | 12/2006 | Drabenstott et al. |
| 7,155,018 B1 | 12/2006 | Stokes, III et al. |
| 7,159,212 B2 | 1/2007 | Schenk et al. |
| 7,164,706 B2 | 1/2007 | Oates |
| 7,167,890 B2 | 1/2007 | Lin et al. |
| 7,170,942 B2 | 1/2007 | Kerofsky |
| 7,181,719 B2 | 2/2007 | Demeure |
| 7,185,176 B2 | 2/2007 | Tanaka et al. |
| 7,185,181 B2 | 2/2007 | Parthasarathy |
| 7,187,663 B2 | 3/2007 | Schmidt |
| 7,196,708 B2 | 3/2007 | Dorojevets et al. |
| 7,203,221 B2 | 4/2007 | Oates |
| 7,210,062 B2 | 4/2007 | Oates et al. |
| 7,210,139 B2 | 4/2007 | Hobson et al. |
| 7,213,128 B2 | 5/2007 | Paver et al. |
| 7,216,140 B1 | 5/2007 | Chen et al. |
| 7,218,645 B2 | 5/2007 | Lotter et al. |
| 7,218,668 B2 | 5/2007 | Oates et al. |
| 7,219,212 B1 | 5/2007 | Sanghavi et al. |
| 7,223,242 B2 | 5/2007 | He et al. |
| 7,236,634 B2 | 6/2007 | Miyakoshi et al. |
| 7,236,998 B2 | 6/2007 | Nutter et al. |
| 7,237,088 B2 | 6/2007 | Barry et al. |
| 7,242,414 B1 | 7/2007 | Thekkath et al. |
| 7,242,988 B1 | 7/2007 | Hoffberg et al. |
| 7,248,623 B2 | 7/2007 | Oates |
| 7,257,696 B2 | 8/2007 | Pechanek et al. |
| 7,266,620 B1 | 9/2007 | Pechanek et al. |
| 7,272,622 B2 | 9/2007 | Sebot et al. |
| 7,272,700 B1 | 9/2007 | Pechanek et al. |
| 7,275,147 B2 | 9/2007 | Tavares |
| 7,287,148 B1 | 10/2007 | Kanapathippillai et al. |
| 7,299,342 B2 | 11/2007 | Nilsson et al. |
| 7,301,541 B2 | 11/2007 | Hansen et al. |
| 7,305,608 B2 | 12/2007 | Taunton et al. |
| 7,308,559 B2 | 12/2007 | Glossner, III et al. |
| 7,310,348 B2 | 12/2007 | Trinh et al. |
| 7,313,788 B2 | 12/2007 | Ben-David et al. |
| 7,317,840 B2 | 1/2008 | DeCegama |
| 7,327,780 B2 | 2/2008 | Oates et al. |
| 7,328,230 B2 | 2/2008 | Aldrich et al. |
| 7,328,332 B2 | 2/2008 | Tran |
| 7,330,209 B2 | 2/2008 | Osamato |
| 7,333,036 B2 | 2/2008 | Oh et al. |
| 7,333,141 B2 | 2/2008 | Hung |
| 7,340,495 B2 | 3/2008 | Buxton et al. |
| 7,343,389 B2 | 3/2008 | Macy et al. |
| 7,349,403 B2 | 3/2008 | Lee et al. |
| 7,353,244 B2 | 4/2008 | Aldrich et al. |
| 7,355,535 B1 | 4/2008 | Anderson et al. |
| 7,366,236 B1 | 4/2008 | Winger |
| 7,373,488 B2 | 5/2008 | Paver et al. |
| 7,376,175 B2 | 5/2008 | Oates et al. |
| 7,376,812 B1 | 5/2008 | Sanghavi et al. |
| 7,386,049 B2 | 6/2008 | Garrido et al. |
| 7,389,317 B2 | 6/2008 | Guttag et al. |
| 7,389,508 B2 | 6/2008 | Aguilar, Jr. et al. |
| 7,392,368 B2 | 6/2008 | Khan et al. |
| 7,392,511 B2 | 6/2008 | Brokenshire et al. |
| 7,395,298 B2 | 7/2008 | Debes et al. |
| 7,395,302 B2 | 7/2008 | Macy et al. |
| 7,395,409 B2 | 7/2008 | Dowling |

(56) References Cited

U.S. PATENT DOCUMENTS

| | | |
|---|---|---|
| 7,397,858 B2 | 7/2008 | Garrido et al. |
| 7,398,458 B2 | 7/2008 | Ferguson |
| 7,400,680 B2 | 7/2008 | Jiang |
| 7,400,682 B2 | 7/2008 | Kerofsky |
| 7,401,333 B2 | 7/2008 | Vandeweerd |
| 7,412,586 B1 | 8/2008 | Rajopadhye et al. |
| 7,412,587 B2 | 8/2008 | Tanaka et al. |
| 7,415,594 B2 | 8/2008 | Doerr et al. |
| 7,415,595 B2 | 8/2008 | Tell et al. |
| 7,415,703 B2 | 8/2008 | Aguilar, Jr. et al. |
| 7,418,008 B2 | 8/2008 | Lotter et al. |
| RE40,509 E | 9/2008 | Pechanek et al. |
| 7,424,594 B2 | 9/2008 | Pitsianis et al. |
| 7,430,578 B2 | 9/2008 | Debes et al. |
| 7,437,013 B2 | 10/2008 | Anderson |
| 7,437,339 B2 | 10/2008 | Matsugu |
| 7,437,719 B2 | 10/2008 | Nagaraj et al. |
| 7,444,632 B2 | 10/2008 | Minor et al. |
| 7,447,873 B1 | 11/2008 | Nordquist |
| 7,450,857 B2 | 11/2008 | Dress et al. |
| 7,451,005 B2 | 11/2008 | Hoffberg et al. |
| 7,453,922 B2 | 11/2008 | Oates et al. |
| 7,467,286 B2 | 12/2008 | Abdallah et al. |
| 7,467,288 B2 | 12/2008 | Glossner, III et al. |
| 7,475,257 B2 | 1/2009 | Aguilar, Jr. et al. |
| 7,478,031 B2 | 1/2009 | Master et al. |
| 7,478,390 B2 | 1/2009 | Brokenshire et al. |
| 7,483,933 B2 | 1/2009 | Wang et al. |
| 7,489,779 B2 | 2/2009 | Scheuermann |
| 7,493,375 B2 | 2/2009 | Master et al. |
| 7,496,917 B2 | 2/2009 | Brokenshire et al. |
| 7,502,517 B2 | 3/2009 | Kodama et al. |
| 7,506,135 B1 | 3/2009 | Mimar |
| 7,506,136 B2 | 3/2009 | Stuttard et al. |
| 7,506,137 B2 | 3/2009 | Pechanek et al. |
| 7,509,366 B2 | 3/2009 | Hansen |
| 7,512,173 B2 | 3/2009 | Sambhwani et al. |
| 7,516,456 B2 | 4/2009 | Aguilar, Jr. et al. |
| 7,523,157 B2 | 4/2009 | Aguilar, Jr. et al. |
| 7,526,630 B2 | 4/2009 | Stuttard et al. |
| 7,529,423 B2 | 5/2009 | Aldrich et al. |
| 7,529,918 B2 | 5/2009 | Taunton |
| 7,532,244 B2 | 5/2009 | Ishikawa et al. |
| 7,539,846 B2 | 5/2009 | Canella et al. |
| 7,548,586 B1 | 6/2009 | Mimar |
| 7,549,145 B2 | 6/2009 | Aguilar, Jr. et al. |
| 7,562,198 B2 | 7/2009 | Noda et al. |
| 7,580,584 B2 | 8/2009 | Holcomb et al. |
| 7,584,342 B1 | 9/2009 | Nordquist et al. |
| 7,594,095 B1 | 9/2009 | Nordquist |
| 7,602,740 B2 | 10/2009 | Master et al. |
| 7,602,851 B2 | 10/2009 | Lee et al. |
| 7,606,943 B2 | 10/2009 | Ramchandran |
| 7,609,297 B2 | 10/2009 | Master et al. |
| RE41,012 E | 11/2009 | Barry et al. |
| 7,624,138 B2 | 11/2009 | Debes et al. |
| 7,626,544 B2 | 12/2009 | Smith et al. |
| 7,627,736 B2 | 12/2009 | Stuttard et al. |
| 7,630,569 B2 | 12/2009 | DeCegama |
| 7,631,025 B2 | 12/2009 | Debes et al. |
| 7,644,255 B2 | 1/2010 | Totsuka |
| 7,650,319 B2 | 1/2010 | Hoffberg et al. |
| 7,653,710 B2 | 1/2010 | Scheuermann et al. |
| 7,653,806 B2 | 1/2010 | Hansen et al. |
| 7,656,950 B2 | 2/2010 | Garrido et al. |
| 7,657,861 B2 | 2/2010 | Vorbach et al. |
| 7,660,973 B2 | 2/2010 | Hansen et al. |
| 7,660,984 B1 | 2/2010 | Master |
| 7,665,041 B2 | 2/2010 | Wilson et al. |
| 7,668,229 B2 | 2/2010 | Sambhwani et al. |
| 7,680,873 B2 | 3/2010 | Pechanek et al. |
| 7,685,212 B2 | 3/2010 | Sebot et al. |
| 7,689,641 B2 | 3/2010 | Abel et al. |
| 7,693,339 B2 | 4/2010 | Wittenstein |
| 7,701,365 B2 | 4/2010 | Fukuhara et al. |
| 7,715,477 B2 | 5/2010 | Garrido et al. |
| 7,715,591 B2 | 5/2010 | Owechko et al. |
| 7,716,100 B2 | 5/2010 | Metlapalli |
| 7,720,013 B1 | 5/2010 | Kelliher et al. |
| 7,721,069 B2 | 5/2010 | Ramchandran et al. |
| 7,724,261 B2 | 5/2010 | Thekkath et al. |
| 7,725,521 B2 | 5/2010 | Chen et al. |
| 7,725,641 B2 | 5/2010 | Park et al. |
| 7,728,845 B2 | 6/2010 | Holub |
| 7,730,287 B2 | 6/2010 | Hansen et al. |
| 7,738,554 B2 | 6/2010 | Lin et al. |
| 7,739,319 B2 | 6/2010 | Macy, Jr. et al. |
| 7,742,405 B2 | 6/2010 | Trinh et al. |
| 7,752,419 B1 | 7/2010 | Plunkett et al. |
| 7,752,426 B2 | 7/2010 | Nye et al. |
| 7,768,287 B2 | 8/2010 | Hayashi et al. |
| 7,769,912 B2 | 8/2010 | Pisek et al. |
| 7,787,688 B1 | 8/2010 | Kass |
| 7,788,468 B1 | 8/2010 | Nickolls et al. |
| 7,791,615 B2 | 9/2010 | Stewart |
| 7,796,841 B2 | 9/2010 | Paillet et al. |
| 7,796,885 B2 | 9/2010 | Dress et al. |
| 7,797,647 B2 | 9/2010 | Hassoun et al. |
| 7,797,691 B2 | 9/2010 | Cockx et al. |
| 7,801,383 B2 | 9/2010 | Sullivan |
| 7,802,079 B2 | 9/2010 | Stuttard et al. |
| 7,805,477 B2 | 9/2010 | Oh et al. |
| 7,809,927 B2 | 10/2010 | Shi et al. |
| 7,813,822 B1 | 10/2010 | Hoffberg |
| 7,814,297 B2 | 10/2010 | Wezelenburg |
| 7,818,356 B2 | 10/2010 | Chen et al. |
| 7,818,548 B2 | 10/2010 | Hansen et al. |
| 7,822,109 B2 | 10/2010 | Scheuermann |
| 7,822,849 B2 | 10/2010 | Titus |
| 7,831,819 B2 | 11/2010 | Chun et al. |
| 7,840,778 B2 | 11/2010 | Hobson et al. |
| 7,843,459 B2 | 11/2010 | Hansen et al. |
| 7,844,796 B2 | 11/2010 | Vorbach et al. |
| 7,849,291 B2 | 12/2010 | Hansen et al. |
| 7,856,611 B2 | 12/2010 | Pisek et al. |
| 7,861,060 B1 | 12/2010 | Nickolls et al. |
| 7,865,894 B1 | 1/2011 | Nordquist et al. |
| 7,870,350 B1 | 1/2011 | Yu et al. |
| 7,873,812 B1 | 1/2011 | Mimar |
| 7,889,204 B2 | 2/2011 | Hansen et al. |
| 7,890,735 B2 | 2/2011 | Tran |
| 7,899,864 B2 | 3/2011 | Margulis |
| 7,904,187 B2 | 3/2011 | Hoffberg et al. |
| 7,924,878 B2 | 4/2011 | Schmidt |
| 7,925,861 B2 | 4/2011 | Stuttard et al. |
| 7,930,623 B2 | 4/2011 | Pisek et al. |
| 7,932,910 B2 | 4/2011 | Hansen et al. |
| 7,932,911 B2 | 4/2011 | Hansen et al. |
| 7,937,559 B1 | 5/2011 | Parameswar et al. |
| 7,937,591 B1 | 5/2011 | Master et al. |
| 7,940,206 B2 | 5/2011 | Nohara et al. |
| 7,940,277 B2 | 5/2011 | Hansen et al. |
| 7,945,760 B1 | 5/2011 | Barry et al. |
| 7,948,496 B2 | 5/2011 | Hansen et al. |
| 7,949,856 B2 | 5/2011 | Knowles |
| 7,952,587 B2 | 5/2011 | Hansen et al. |
| 7,953,021 B2 | 5/2011 | Lotter et al. |
| 7,953,938 B2 | 5/2011 | Nakajima |
| 7,962,667 B2 | 6/2011 | Pechanek et al. |
| 7,966,078 B2 | 6/2011 | Hoffberg et al. |
| 7,966,475 B2 | 6/2011 | Stuttard et al. |
| 7,970,279 B2 | 6/2011 | Dress |
| 7,974,714 B2 | 7/2011 | Hoffberg |
| 7,987,003 B2 | 7/2011 | Hoffberg et al. |
| 7,996,671 B2 | 8/2011 | Chheda et al. |
| RE42,728 E | 9/2011 | Madrane |
| 8,018,464 B2 | 9/2011 | Hansen et al. |
| 8,023,561 B1 | 9/2011 | Garrido et al. |
| 8,031,951 B2 | 10/2011 | Takada |
| 8,032,477 B1 | 10/2011 | Hoffberg et al. |
| 8,036,274 B2 | 10/2011 | Srinivasan et al. |
| 8,046,313 B2 | 10/2011 | Hoffberg et al. |
| 8,068,984 B2 | 11/2011 | Smith et al. |

(56) References Cited

U.S. PATENT DOCUMENTS

| | | |
|---|---|---|
| 8,074,224 B1 * | 12/2011 | Nordquist ............ G06F 9/30123 718/104 |
| 8,082,419 B2 | 12/2011 | Aldrich et al. |
| 8,108,641 B2 | 1/2012 | Goss et al. |
| 8,108,656 B2 | 1/2012 | Katragadda et al. |
| 8,112,513 B2 | 2/2012 | Margulis |
| 8,117,137 B2 | 2/2012 | Xu et al. |
| 8,117,426 B2 | 2/2012 | Hansen et al. |
| 8,131,612 B1 | 3/2012 | Payne |
| 8,135,224 B2 | 3/2012 | Nilsson et al. |
| 8,156,284 B2 | 4/2012 | Vorbach et al. |
| 8,156,481 B1 | 4/2012 | Koh et al. |
| 8,165,916 B2 | 4/2012 | Hoffberg et al. |
| 8,169,440 B2 | 5/2012 | Stuttard et al. |
| 8,171,263 B2 | 5/2012 | Stuttard et al. |
| 8,174,529 B2 | 5/2012 | Iwaki et al. |
| 8,174,530 B2 | 5/2012 | Stuttard et al. |
| 8,175,262 B1 | 5/2012 | Leung et al. |
| 8,176,398 B2 | 5/2012 | Taunton et al. |
| 8,190,807 B2 | 5/2012 | Reid et al. |
| 8,200,025 B2 | 6/2012 | Woodbeck |
| 8,208,549 B2 | 6/2012 | Sasai et al. |
| 8,218,624 B2 | 7/2012 | Holcomb et al. |
| 8,219,378 B1 | 7/2012 | Koh |
| 8,237,711 B2 | 8/2012 | McCombe et al. |
| 8,238,624 B2 | 8/2012 | Doi et al. |
| 8,249,616 B2 | 8/2012 | Boejer et al. |
| 8,250,337 B2 | 8/2012 | Shih |
| 8,250,339 B2 | 8/2012 | Master et al. |
| 8,250,503 B2 | 8/2012 | Vorbach et al. |
| 8,250,549 B2 | 8/2012 | Reid et al. |
| 8,254,455 B2 | 8/2012 | Wu et al. |
| 8,254,707 B2 | 8/2012 | Fukuhara et al. |
| 8,265,144 B2 | 9/2012 | Christoffersen et al. |
| 8,276,135 B2 | 9/2012 | Master |
| 8,284,204 B2 | 10/2012 | Kalaiah et al. |
| 8,287,456 B2 | 10/2012 | Daigle |
| 8,289,335 B2 | 10/2012 | Hansen et al. |
| 8,300,935 B2 | 10/2012 | Distante et al. |
| 8,320,693 B2 | 11/2012 | Fukuhara et al. |
| 8,326,049 B2 | 12/2012 | Rovati et al. |
| 8,327,158 B2 | 12/2012 | Titiano et al. |
| 8,385,424 B2 | 2/2013 | Reznik |
| 8,402,490 B2 | 3/2013 | Hoffberg-Borghesani et al. |
| 8,429,625 B2 | 4/2013 | Liege |
| 8,448,067 B2 | 5/2013 | Cerny et al. |
| 8,457,958 B2 | 6/2013 | Koishida et al. |
| 8,484,441 B2 | 7/2013 | Knowles |
| 8,505,002 B2 | 8/2013 | Yehia et al. |
| 8,512,241 B2 | 8/2013 | Bandy et al. |
| 8,516,266 B2 | 8/2013 | Hoffberg et al. |
| 8,538,015 B2 | 9/2013 | Gueron et al. |
| 8,571,473 B2 | 10/2013 | Lee |
| 8,578,387 B1 | 11/2013 | Mills et al. |
| 8,606,023 B2 | 12/2013 | Reznik et al. |
| 8,612,732 B2 | 12/2013 | Grover et al. |
| 8,615,284 B2 | 12/2013 | Arneson et al. |
| 8,631,483 B2 | 1/2014 | Soni et al. |
| 8,665,943 B2 | 3/2014 | Fukuhara et al. |
| 8,686,939 B2 | 4/2014 | Mao et al. |
| 8,736,675 B1 | 5/2014 | Holzbach et al. |
| 8,745,541 B2 | 6/2014 | Wilson et al. |
| 8,755,515 B1 | 6/2014 | Wu |
| 8,755,675 B2 | 6/2014 | Direnzo et al. |
| 8,762,691 B2 | 6/2014 | Stuttard et al. |
| 8,776,030 B2 | 7/2014 | Grover et al. |
| 8,797,260 B2 | 8/2014 | Mao et al. |
| 8,811,470 B2 | 8/2014 | Kimura et al. |
| 8,817,031 B2 | 8/2014 | Hakura et al. |
| 8,904,151 B2 | 12/2014 | Gschwind et al. |
| 8,947,347 B2 | 2/2015 | Mao et al. |
| 8,977,836 B2 | 3/2015 | Fish, III |
| 8,984,498 B2 | 3/2015 | Grover et al. |
| 9,047,094 B2 | 6/2015 | Knowles |
| 9,060,175 B2 | 6/2015 | Wang et al. |
| 9,069,547 B2 | 6/2015 | Julier et al. |
| 9,137,567 B2 | 9/2015 | Vestergaard et al. |
| 9,143,826 B2 | 9/2015 | Vestergaard et al. |
| 9,183,560 B2 | 11/2015 | Abelow |
| 9,215,499 B2 | 12/2015 | Vestergaard et al. |
| 9,648,325 B2 | 5/2017 | Baeza et al. |
| 9,727,042 B2 | 8/2017 | Hoffberg-Borghesani et al. |
| 9,832,543 B1 | 11/2017 | Wu |
| 2001/0014904 A1 | 8/2001 | Wang |
| 2001/0038693 A1 | 11/2001 | Luyster |
| 2001/0041012 A1 | 11/2001 | Hsieh et al. |
| 2001/0045988 A1 | 11/2001 | Yamauchi et al. |
| 2001/0049763 A1 | 12/2001 | Barry et al. |
| 2002/0002574 A1 | 1/2002 | Jennings |
| 2002/0003578 A1 | 1/2002 | Koshiba et al. |
| 2002/0004809 A1 | 1/2002 | Golliver et al. |
| 2002/0012054 A1 | 1/2002 | Osamato |
| 2002/0012055 A1 | 1/2002 | Koshiba et al. |
| 2002/0012398 A1 | 1/2002 | Zhou et al. |
| 2002/0012470 A1 | 1/2002 | Luna et al. |
| 2002/0015447 A1 | 2/2002 | Zhou |
| 2002/0027604 A1 | 3/2002 | Hung |
| 2002/0038294 A1 | 3/2002 | Matsugu |
| 2002/0064139 A1 | 5/2002 | Bist et al. |
| 2002/0073299 A1 | 6/2002 | Pechanek et al. |
| 2002/0076034 A1 | 6/2002 | Prabhu et al. |
| 2002/0078320 A1 | 6/2002 | Barry et al. |
| 2002/0085648 A1 | 7/2002 | Burns et al. |
| 2002/0110269 A1 | 8/2002 | Floeder et al. |
| 2002/0116595 A1 | 8/2002 | Morton |
| 2002/0118827 A1 | 8/2002 | Luyster |
| 2002/0131501 A1 | 9/2002 | Morad et al. |
| 2002/0135502 A1 | 9/2002 | Lu |
| 2002/0135583 A1 | 9/2002 | Ohba |
| 2002/0135683 A1 | 9/2002 | Tamama et al. |
| 2002/0151992 A1 | 10/2002 | Hoffberg et al. |
| 2002/0154123 A1 | 10/2002 | Harasimiuk |
| 2002/0165709 A1 | 11/2002 | Sadri et al. |
| 2002/0169813 A1 | 11/2002 | Pechanek et al. |
| 2002/0178207 A1 | 11/2002 | McNeil |
| 2002/0178345 A1 | 11/2002 | Drabenstott et al. |
| 2002/0198911 A1 | 12/2002 | Blomgren et al. |
| 2003/0004583 A1 | 1/2003 | Matsugu et al. |
| 2003/0004697 A1 | 1/2003 | Ferris |
| 2003/0004907 A1 | 1/2003 | Matsugu |
| 2003/0008684 A1 | 1/2003 | Ferris |
| 2003/0031368 A1 | 2/2003 | Myler et al. |
| 2003/0061473 A1 | 3/2003 | Revilla et al. |
| 2003/0065489 A1 | 4/2003 | Guevorkian et al. |
| 2003/0065904 A1 | 4/2003 | Burns et al. |
| 2003/0067894 A1 | 4/2003 | Schmidt |
| 2003/0076875 A1 | 4/2003 | Oates |
| 2003/0079109 A1 | 4/2003 | Pechanek et al. |
| 2003/0088182 A1 | 5/2003 | He et al. |
| 2003/0088601 A1 | 5/2003 | Pitsianis et al. |
| 2003/0088754 A1 | 5/2003 | Barry et al. |
| 2003/0088755 A1 | 5/2003 | Gudmunson et al. |
| 2003/0091058 A1 | 5/2003 | Oates et al. |
| 2003/0091102 A1 | 5/2003 | Oates |
| 2003/0091106 A1 | 5/2003 | Oates |
| 2003/0099224 A1 | 5/2003 | Oates |
| 2003/0099291 A1 | 5/2003 | Kerofsky |
| 2003/0100833 A1 | 5/2003 | He et al. |
| 2003/0105793 A1 | 6/2003 | Guttag et al. |
| 2003/0112876 A1 | 6/2003 | Kerofsky |
| 2003/0121029 A1 | 6/2003 | Harrison et al. |
| 2003/0123553 A1 | 7/2003 | Kerofsky |
| 2003/0123579 A1 | 7/2003 | Safavi et al. |
| 2003/0126351 A1 | 7/2003 | Park |
| 2003/0128739 A1 | 7/2003 | Oates et al. |
| 2003/0152076 A1 | 8/2003 | Lee et al. |
| 2003/0152084 A1 | 8/2003 | Lee et al. |
| 2003/0172221 A1 | 9/2003 | McNeil |
| 2003/0179941 A1 | 9/2003 | DeCegama |
| 2003/0182336 A1 | 9/2003 | Nielsen et al. |
| 2003/0191887 A1 | 10/2003 | Oates et al. |
| 2003/0198197 A1 | 10/2003 | Oates et al. |
| 2003/0200420 A1 | 10/2003 | Pechanek et al. |
| 2003/0202559 A1 | 10/2003 | Oates et al. |

(56) References Cited

U.S. PATENT DOCUMENTS

| | | |
|---|---|---|
| 2003/0202566 A1 | 10/2003 | Oates et al. |
| 2003/0206585 A1 | 11/2003 | Kerofsky |
| 2003/0219034 A1 | 11/2003 | Lotter et al. |
| 2003/0222879 A1 | 12/2003 | Lin et al. |
| 2003/0222998 A1 | 12/2003 | Yamauchi et al. |
| 2003/0231702 A1 | 12/2003 | Oates et al. |
| 2004/0003201 A1 | 1/2004 | Burns et al. |
| 2004/0003370 A1 | 1/2004 | Schenk et al. |
| 2004/0017852 A1 | 1/2004 | Garrido et al. |
| 2004/0017853 A1 | 1/2004 | Garrido et al. |
| 2004/0022318 A1 | 2/2004 | Garrido et al. |
| 2004/0030859 A1 | 2/2004 | Doerr et al. |
| 2004/0034760 A1 | 2/2004 | Paver et al. |
| 2004/0039899 A1 | 2/2004 | Drabenstott et al. |
| 2004/0049664 A1 | 3/2004 | Drabenstott et al. |
| 2004/0054871 A1 | 3/2004 | Pechanek et al. |
| 2004/0073589 A1 | 4/2004 | Debes et al. |
| 2004/0073773 A1 | 4/2004 | Demjanenko |
| 2004/0078549 A1 | 4/2004 | Tanaka et al. |
| 2004/0078554 A1 | 4/2004 | Glossner et al. |
| 2004/0078556 A1 | 4/2004 | Spracklen |
| 2004/0078674 A1 | 4/2004 | Raimi et al. |
| 2004/0093484 A1 | 5/2004 | Barry et al. |
| 2004/0098562 A1 | 5/2004 | Anderson et al. |
| 2004/0103262 A1 | 5/2004 | Glossner et al. |
| 2004/0107333 A1 | 6/2004 | Drabenstott et al. |
| 2004/0117422 A1 | 6/2004 | Debes et al. |
| 2004/0145501 A1 | 7/2004 | Hung |
| 2004/0153634 A1 | 8/2004 | Barry et al. |
| 2004/0189720 A1 | 9/2004 | Wilson et al. |
| 2004/0193848 A1 | 9/2004 | Tavares |
| 2004/0210903 A1* | 10/2004 | Kosanovic ............ G06F 9/5011 718/105 |
| 2004/0218679 A1 | 11/2004 | Luna et al. |
| 2004/0221137 A1 | 11/2004 | Pitsianis et al. |
| 2004/0233986 A1 | 11/2004 | Morad et al. |
| 2004/0240548 A1 | 12/2004 | Morad et al. |
| 2004/0250045 A1 | 12/2004 | Dowling |
| 2004/0263363 A1 | 12/2004 | Biswas |
| 2004/0267857 A1 | 12/2004 | Abel et al. |
| 2005/0025237 A1 | 2/2005 | Kerofsky |
| 2005/0062746 A1 | 3/2005 | Kataoka et al. |
| 2005/0069037 A1 | 3/2005 | Jiang |
| 2005/0071403 A1* | 3/2005 | Taunton ............... G06F 9/30014 708/404 |
| 2005/0071404 A1 | 3/2005 | Nutter et al. |
| 2005/0071513 A1 | 3/2005 | Aguilar, Jr. et al. |
| 2005/0071526 A1 | 3/2005 | Brokenshire et al. |
| 2005/0071578 A1 | 3/2005 | Day et al. |
| 2005/0071651 A1 | 3/2005 | Aguilar, Jr. et al. |
| 2005/0071828 A1 | 3/2005 | Brokenshire et al. |
| 2005/0081181 A1 | 4/2005 | Brokenshire et al. |
| 2005/0081182 A1 | 4/2005 | Minor et al. |
| 2005/0081201 A1 | 4/2005 | Aguilar, Jr. et al. |
| 2005/0081202 A1 | 4/2005 | Brokenshire et al. |
| 2005/0081203 A1 | 4/2005 | Aguilar, Jr. et al. |
| 2005/0086655 A1 | 4/2005 | Aguilar, Jr. et al. |
| 2005/0091473 A1 | 4/2005 | Aguilar, Jr. et al. |
| 2005/0097301 A1 | 5/2005 | Ben-David et al. |
| 2005/0100111 A1 | 5/2005 | Taunton et al. |
| 2005/0135700 A1 | 6/2005 | Anderson |
| 2005/0135948 A1 | 6/2005 | Olsen et al. |
| 2005/0160406 A1 | 7/2005 | Duncan et al. |
| 2005/0188364 A1 | 8/2005 | Cockx et al. |
| 2005/0213842 A1 | 9/2005 | Aldrich et al. |
| 2005/0216545 A1 | 9/2005 | Aldrich et al. |
| 2005/0216699 A1 | 9/2005 | Tanaka et al. |
| 2005/0219251 A1 | 10/2005 | Chun et al. |
| 2005/0219422 A1 | 10/2005 | Dorojevets et al. |
| 2005/0223193 A1 | 10/2005 | Knowles |
| 2005/0223196 A1 | 10/2005 | Knowles |
| 2005/0223197 A1 | 10/2005 | Knowles |
| 2005/0223380 A1 | 10/2005 | Chun et al. |
| 2005/0226337 A1 | 10/2005 | Dorojevets et al. |
| 2005/0235025 A1* | 10/2005 | Aldrich ................ G06F 7/5443 708/523 |
| 2005/0240870 A1 | 10/2005 | Aldrich et al. |
| 2005/0265577 A1 | 12/2005 | DeCegama |
| 2005/0280728 A1 | 12/2005 | Ishikawa et al. |
| 2005/0285862 A1 | 12/2005 | Noda et al. |
| 2006/0015702 A1 | 1/2006 | Khan et al. |
| 2006/0015703 A1 | 1/2006 | Ramchandran et al. |
| 2006/0061497 A1 | 3/2006 | Matsumura et al. |
| 2006/0072014 A1 | 4/2006 | Geng et al. |
| 2006/0095745 A1 | 5/2006 | Tran |
| 2006/0095750 A1 | 5/2006 | Nye et al. |
| 2006/0110054 A1 | 5/2006 | Rovati et al. |
| 2006/0155398 A1 | 7/2006 | Hoffberg et al. |
| 2006/0184599 A1 | 8/2006 | Wang et al. |
| 2006/0184910 A1 | 8/2006 | Pisek et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0211387 A1 | 9/2006 | Pisek et al. |
| 2006/0212502 A1 | 9/2006 | Chatterjee |
| 2006/0224656 A1 | 10/2006 | Pechanek et al. |
| 2006/0225002 A1 | 10/2006 | Hassoun et al. |
| 2006/0236214 A1 | 10/2006 | Ferguson |
| 2006/0238406 A1 | 10/2006 | Nohara et al. |
| 2006/0239471 A1 | 10/2006 | Mao et al. |
| 2006/0241929 A1 | 10/2006 | Ferris |
| 2006/0248311 A1 | 11/2006 | Jennings |
| 2006/0248317 A1 | 11/2006 | Vorbach et al. |
| 2006/0253288 A1 | 11/2006 | Chu et al. |
| 2006/0268777 A1 | 11/2006 | Schmidt |
| 2006/0271764 A1 | 11/2006 | Nilsson et al. |
| 2006/0271765 A1 | 11/2006 | Tell et al. |
| 2006/0277316 A1 | 12/2006 | Wang et al. |
| 2006/0280360 A1 | 12/2006 | Holub |
| 2007/0005327 A1 | 1/2007 | Ferris |
| 2007/0005937 A1 | 1/2007 | Anderson et al. |
| 2007/0011120 A1 | 1/2007 | Matsugu |
| 2007/0016476 A1 | 1/2007 | Hoffberg et al. |
| 2007/0024472 A1 | 2/2007 | Oh et al. |
| 2007/0027695 A1 | 2/2007 | Oh et al. |
| 2007/0028076 A1 | 2/2007 | Wezelenburg |
| 2007/0036225 A1 | 2/2007 | Srinivasan et al. |
| 2007/0050603 A1 | 3/2007 | Vorbach et al. |
| 2007/0053513 A1 | 3/2007 | Hoffberg |
| 2007/0061022 A1 | 3/2007 | Hoffberg-Borghesani et al. |
| 2007/0061023 A1 | 3/2007 | Hoffberg et al. |
| 2007/0061735 A1 | 3/2007 | Hoffberg et al. |
| 2007/0070038 A1 | 3/2007 | Hoffberg et al. |
| 2007/0097130 A1 | 5/2007 | Margulis |
| 2007/0110053 A1 | 5/2007 | Soni et al. |
| 2007/0113038 A1 | 5/2007 | Hobson et al. |
| 2007/0124474 A1 | 5/2007 | Margulis |
| 2007/0165959 A1* | 7/2007 | Takada .................. H04N 19/63 382/240 |
| 2007/0168408 A1* | 7/2007 | Skelton ............. H03H 21/0043 708/322 |
| 2007/0189227 A1 | 8/2007 | Lotter et al. |
| 2007/0198815 A1 | 8/2007 | Liu et al. |
| 2007/0198901 A1 | 8/2007 | Ramchandran et al. |
| 2007/0204132 A1 | 8/2007 | Paver et al. |
| 2007/0204137 A1 | 8/2007 | Tran |
| 2007/0205921 A1 | 9/2007 | Sawitzki |
| 2007/0206634 A1 | 9/2007 | Lotter et al. |
| 2007/0226601 A1 | 9/2007 | Pisek et al. |
| 2007/0230914 A1 | 10/2007 | Garrido et al. |
| 2007/0247936 A1 | 10/2007 | Direnzo et al. |
| 2007/0260855 A1 | 11/2007 | Gschwind et al. |
| 2007/0265531 A1 | 11/2007 | He et al. |
| 2007/0286275 A1 | 12/2007 | Kimura et al. |
| 2007/0294496 A1 | 12/2007 | Goss et al. |
| 2007/0294511 A1 | 12/2007 | Ramchandran et al. |
| 2008/0007559 A1 | 1/2008 | Kalaiah et al. |
| 2008/0016320 A1 | 1/2008 | Menon et al. |
| 2008/0022077 A1 | 1/2008 | Thekkath et al. |
| 2008/0022078 A1 | 1/2008 | Taunton |
| 2008/0040584 A1 | 2/2008 | Hansen et al. |
| 2008/0040749 A1 | 2/2008 | Hoffberg et al. |

(56) References Cited

U.S. PATENT DOCUMENTS

| | | | |
|---|---|---|---|
| 2008/0059766 A1 | 3/2008 | Hansen et al. | |
| 2008/0059767 A1 | 3/2008 | Hansen et al. | |
| 2008/0065860 A1 | 3/2008 | Hansen et al. | |
| 2008/0065862 A1 | 3/2008 | Hansen et al. | |
| 2008/0072020 A1 | 3/2008 | Hansen et al. | |
| 2008/0077771 A1 | 3/2008 | Guttag et al. | |
| 2008/0088507 A1 | 4/2008 | Smith et al. | |
| 2008/0091350 A1 | 4/2008 | Smith et al. | |
| 2008/0091758 A1 | 4/2008 | Hansen et al. | |
| 2008/0091904 A1 | 4/2008 | Nakajima | |
| 2008/0091925 A1 | 4/2008 | Hansen et al. | |
| 2008/0098207 A1 | 4/2008 | Reid et al. | |
| 2008/0098208 A1 | 4/2008 | Reid et al. | |
| 2008/0104375 A1 | 5/2008 | Hansen et al. | |
| 2008/0104376 A1 | 5/2008 | Hansen et al. | |
| 2008/0112885 A1 | 5/2008 | Okunev et al. | |
| 2008/0114224 A1 | 5/2008 | Bandy et al. | |
| 2008/0114921 A1 | 5/2008 | Park et al. | |
| 2008/0114937 A1 | 5/2008 | Reid et al. | |
| 2008/0123750 A1 | 5/2008 | Bronstein et al. | |
| 2008/0126278 A1 | 5/2008 | Bronstein et al. | |
| 2008/0133892 A1 | 6/2008 | Pechanek et al. | |
| 2008/0137771 A1 | 6/2008 | Taunton et al. | |
| 2008/0141012 A1 | 6/2008 | Yehia et al. | |
| 2008/0141131 A1 | 6/2008 | Cerny et al. | |
| 2008/0161660 A1 | 7/2008 | Arneson et al. | |
| 2008/0162770 A1 | 7/2008 | Titiano et al. | |
| 2008/0162882 A1 | 7/2008 | Hansen et al. | |
| 2008/0177986 A1 | 7/2008 | Hansen et al. | |
| 2008/0181308 A1 | 7/2008 | Wang et al. | |
| 2008/0181472 A1 | 7/2008 | Doi et al. | |
| 2008/0189512 A1 | 8/2008 | Hansen et al. | |
| 2008/0201468 A1 | 8/2008 | Titus | |
| 2008/0215768 A1 | 9/2008 | Reid et al. | |
| 2008/0219575 A1 | 9/2008 | Wittenstein | |
| 2008/0256330 A1 | 10/2008 | Wang et al. | |
| 2008/0262764 A1* | 10/2008 | Sedeh | G06F 13/4027 702/67 |
| 2008/0320038 A1 | 12/2008 | Liege | |
| 2008/0320240 A1* | 12/2008 | Savic | G11C 7/1075 711/151 |
| 2009/0031105 A1 | 1/2009 | Hansen et al. | |
| 2009/0054075 A1 | 2/2009 | Boejer et al. | |
| 2009/0063724 A1 | 3/2009 | Pechanek et al. | |
| 2009/0074052 A1 | 3/2009 | Fukuhara et al. | |
| 2009/0083498 A1 | 3/2009 | Hansen et al. | |
| 2009/0089540 A1 | 4/2009 | Hansen et al. | |
| 2009/0092326 A1 | 4/2009 | Fukuhara et al. | |
| 2009/0100227 A1 | 4/2009 | Hansen et al. | |
| 2009/0102686 A1 | 4/2009 | Fukuhara et al. | |
| 2009/0106536 A1 | 4/2009 | Hansen et al. | |
| 2009/0112095 A1 | 4/2009 | Daigle | |
| 2009/0113176 A1 | 4/2009 | Hansen et al. | |
| 2009/0113185 A1 | 4/2009 | Hansen et al. | |
| 2009/0113187 A1 | 4/2009 | Hansen et al. | |
| 2009/0128562 A1 | 5/2009 | McCombe et al. | |
| 2009/0158012 A1 | 6/2009 | Hansen et al. | |
| 2009/0274378 A1 | 11/2009 | Fukuhara et al. | |
| 2011/0029922 A1 | 2/2011 | Hoffberg et al. | |
| 2012/0001930 A1 | 1/2012 | Iwaki et al. | |
| 2012/0069131 A1 | 3/2012 | Abelow | |
| 2012/0182302 A1 | 7/2012 | Iwaki et al. | |
| 2013/0044260 A1 | 2/2013 | Vestergaard et al. | |
| 2013/0044802 A1 | 2/2013 | Vestergaard et al. | |
| 2013/0044805 A1 | 2/2013 | Vestergaard et al. | |
| 2013/0044822 A1 | 2/2013 | Vestergaard et al. | |
| 2013/0044823 A1 | 2/2013 | Vestergaard et al. | |
| 2013/0044824 A1 | 2/2013 | Vestergaard et al. | |
| 2013/0047074 A1 | 2/2013 | Vestergaard et al. | |
| 2014/0195330 A1 | 7/2014 | Lee et al. | |

OTHER PUBLICATIONS

Trebien, Fernando, and Manuel M. Oliveira. "Realistic real-time sound re-synthesis and processing for interactive virtual worlds." The Visual Computer 25.5-7 (2009): 469-477.

Fabritius, Frederik. Audio processing algorithms on the GPU. Diss. Technical University of Denmark, DTU, DK-2800 Kgs. Lyngby, Denmark, 2009.

Wefers, Frank, and Jan Berg. "High-performance real-time FIR-filtering using fast convolution on graphics hardware." Proc. of the 13th Conference on Digital Audio Effects. 2010.

Röber, Niklas, Martin Spindler, and Maic Masuch. "Waveguide-based room acoustics through graphics hardware." Proceedings of ICMC. 2006.

Moreira, B., et al. "An Architecture Using a Finite Difference Method to Calculate Realistic Sound Equalization in Games." Games and Digital Entertainment (SBGAMES), 2011 Brazilian Symposium on. IEEE, 2011.

Hamidi, Foad, and Bill Kapralos. "A review of spatial sound for virtual environments and games with graphics processing units." Open Virtual Reality Journal 1 (2009): 8-17.

Cowan, Brent, and Bill Kapralos. "Spatial sound for video games and virtual environments utilizing real-time GPU-based convolution." Proceedings of the 2008 Conference on Future Play: Research, Play, Share. ACM, 2008.

Savioja, Lauri. "Real-time 3D finite-difference time-domain simulation of low-and mid-frequency room acoustics." 13th Int. Conf on Digital Audio Effects. vol. 1. 2010.

Tsingos, Nicolas. "Using programmable graphics hardware for auralization." Proc. EAA Symposium on Auralization, Espoo, Finland. 2009.

Mauro, Davide Andrea, and Ernesto Damiani. "On Binaural Spatialization and The Use of GPUGU for Audio Processing." Ph.D. Thesis U. Degli Studi Di Milano, 2012.

Da Computação, Curso De Ciência. A GPU-based Real-Time Modular Audio Processing System. Diss. Universidade Federal Do Rio Grande Do Sul, 2006.

Rodriguez, Jose Antonio Belloch. "Performance Improvement of Multichannel Audio by Graphics Processing Units." (2014).

Mauro, Davide Andrea. "Audio convolution by the mean of GPU: CUDA and OpenCL implementations." Acoustics 2012. 2012.

Salazar, Adrian. "General-Purpose Computation Using Graphical Processing Units." (2008).

Kartashev, Pavel, and V. Nazaruk. "Analysis of Gpgpu Platforms Efficiency in General-Purpose Computations." publication. editionName (2011): 857-863.

Guher, Muge. "Signal Processing and General Purpose Computing on GPU." (circa 2012).

Theodoropoulos, Dimitris, Catalin Bogdan Ciobanu, and Georgi Kuzmanov. "Wave field synthesis for 3D audio: architectural prospectives." Proceedings of the 6th ACM conference on Computing frontiers. ACM, 2009.

Gjermundsen, Aleksander. "CPU and GPU Co-processing for Sound." (2010).

Annex to ITU Operational Bulletin No. 781-1.II.2003.

U.S. Appl. No. 10/361,802, filed Jul. 23, 2019, Hoffberg-Borghesani et al.

* cited by examiner

PARALLEL SIGNAL PROCESSING SYSTEM AND METHOD

CROSS REFERENCE TO RELATED APPLICATIONS

The present application is a Continuation of U.S. patent application Ser. No. 15/823,430, filed Nov. 27, 2019, now U.S. Pat. No. 10,524,024, issued Dec. 31, 2019, which is a Continuation of U.S. patent application Ser. No. 14/305,432, filed Jun. 16, 2014, now U.S. Pat. No. 9,832,543, issued Nov. 28, 2017, which is a Division of U.S. patent application Ser. No. 12/569,456, filed Sep. 29, 2009, issued Jun. 17, 2014 as U.S. Pat. No. 8,755,515, which Claims benefit of priority from U.S. Provisional Patent Application No. 61/101,050, filed Sep. 29, 2008, the entirety of which are expressly incorporated herein by reference.

BACKGROUND

1. Field of the Invention

The invention relates to the field of real time digital signal processing, particularly in a context of a general-purpose computer executing a non-real-time operating system.

2. Background of the Invention

While modern architecture general purpose central processing units (CPU's) typically have sufficient processing capability to perform signal processing tasks, to some degree, the various operating systems used to implement systems, such as Windows XP, Windows Vista, Linux and Unix-derivative, and Macintosh operating systems have difficulty supporting substantive real-time processing of complex signals representing large amounts of data to be processed, except perhaps particular data types for which the processor has special purpose instructions or hardware execution units. The various software processes handled by such processors compete for processing capability, making it difficult for a programmer or system designer to predict the real-time performance envelope of such a system with any degree of accuracy; therefore, the effective real-time performance is well below the theoretical processing envelope in a real-world system which is not particularly designed to be dedicated to real-time functionality. Therefore, as the real-time processing capacity increases, and the processing latency becomes more critical, general purpose computers with desktop or server operating systems are deemed less suitable for tasks that impose real-time requirements.

Typically, when one of two strategies is implemented to improve the real-time performance of a system: provide a coprocessor which handles only the required real-time tasks, and using a so-called real-time operating system (RTOS) with restrictions on other software which may execute in the same environment.

Existing telephone systems, such as the CallTrol Object Telephone Server (OTS™), tend to require and rely upon special purpose hardware to handle real-time signal processing tasks for large numbers of concurrent voice channels. More information about this system can be found at www.calltrol.com/CalltrolSDKWhitepaper6-02.pdf, which is expressly incorporated herein by reference in its entirety.

3. Call Progress Tone Analysis

In many traditional systems, a single dedicated analog and/or digital circuit is provided for each public switch telephone network (PSTN) line. See, e.g., Consumer Microcircuits Limited CMX673 datasheet, Clare M-985-01 datasheet. In other types of systems, a digital signal processor (coprocessor) is provided to handle signal processing tasks for multiple channels in parallel. Two particular tasks which require significant signal processing capability are call tone progress analysis and echo cancellation. See, e.g., Manish Marwah and Sharmistha Das, "UNICA—A Unified Classification Algorithm For Call Progress Tones" (Avaya Labs, University of Colorado), en.wikipedia.org/wiki/Echo_cancellation, and www.voip-info.org/wiki/view/Asterisk+echo+cancellation, each of which is expressly incorporated herein by reference.

Call progress tone signals provide information regarding the status or progress of a call to customers, operators, and connected equipment. In circuit-associated signaling, these audible tones are transmitted over the voice path within the frequency limits of the voice band. The four most common call progress tones are: Dial tone; Busy tone; Audible ringback; and Reorder tone. In addition to these, there are a number of other defined tones, including for example the 12 DTMF codes on a normal telephone keypad. There may be, for example, about 53 different tones supported by a system. A call progress tone detector, may additionally respond to cue indicating Cessation of ringback; Presence/cessation of voice; Special Information Tones (SITs); and Pager cue tones. Collectively, call progress tones and these other audible signals are referred to as call progress events. Call progress tone generation/detection in the network is generally based on a Precise Tone Plan. In the plan, four distinctive tones are used singly or in combination to produce unique progress tone signals. These tones are 350 Hz, 440 Hz, 480 Hz and 620 Hz. Each call progress tone is defined by the frequencies used and a specific on/off temporal pattern.

The ITU-T E.180 and E.182 recommendations define the technical characteristics and intended usage of some of these tones: busy tone or busy signal; call waiting tone; comfort tone; conference call tone; confirmation tone; congestion tone; dial tone; end of three-party service tone (three-way calling); executive override tone; holding tone; howler tone; intercept tone; intrusion tone; line lock-out tone; negative indication tone; notify tone; number unobtainable tone; pay tone; payphone recognition tone; permanent signal tone; preemption tone; queue tone; recall dial tone; record tone; ringback tone or ringing tone; ringtone or ringing signal; second dial tone; special dial tone; special information tone (SIT); waiting tone; warning tone; Acceptance tone; Audible ring tone; Busy override warning tone; Busy verification tone; Engaged tone; Facilities tone; Fast busy tone; Function acknowledge tone; Identification tone; Intercept tone; Permanent signal tone; Positive indication tone; Re-order tone; Refusal tone; Ringback tone; Route tone; Service activated tone; Special ringing tone; Stutter dial tone; Switching tone; Test number tone; Test tone; and Trunk offering tone. In addition, signals sent to the PSTN include Answer tone; Calling tone; Guard tone; Pulse (loop disconnect) dialing; Tone (DTMF) dialing, and other signals from the PSTN include Billing (metering) signal; DC conditions; and Ringing signal. The tones, cadence, and tone definitions, may differ between different countries, carriers, types of equipment, etc. See, e.g., Annex to ITU Operational Bulletin No. 781-1.11.2003. Various Tones Used In National Networks (According To ITU-T Recommendation E.180) (03/1998).

Characteristics for the call progress events are shown in Table 1.

TABLE 1

| Call Progress Event Characteristics Name | Frequencies (Hz) | Temporal Pattern | Event Reported After |
|---|---|---|---|
| Dial Tone | 350 + 440 | Steady tone | Approximately 0.75 seconds |
| Busy Tone | 480 + 620 | 0.5 seconds on/ 0.5 seconds off | 2 cycles of precise, 3 cycles of nonprecise |
| Detection Audible Ringback | 440 + 480 | 2 seconds on/ 4 seconds off | 2 cycles of precise or nonprecise |
| Cessation | — | — | 3 to 6.5 seconds after ringback detected |
| Reorder | 480 + 620 | 0.25 seconds on/0.25 seconds off | 2 cycles of precise, 3 cycles of nonprecise |
| Detection Voice | 200 to 3400 | — | Approximately 0.25 to 0.50 seconds |
| Cessation | — | — | Approximately 0.5 to 1.0 seconds after voice detected |
| Special Information Tones (SITs) | See Table 2. | See Table 2. | Approximately 0.25 to 0.75 seconds |
| Pager Cue Tones | 1400 | 3 to 4 tones at 0.1 to 0.125 intervals | 2 cycles of precise or any pattern of 1400-Hz signals |

Dial tone indicates that the CO is ready to accept digits from the subscriber. In the precise tone plan, dial tone consists of 350 Hz plus 440 Hz. The system reports the presence of precise dial tone after approximately 0.75 seconds of steady tone. Nonprecise dial tone is reported after the system detects a burst of raw energy lasting for approximately 3 seconds.

Busy tone indicates that the called line has been reached but it is engaged in another call. In the precise tone plan, busy tone consists of 480 Hz plus 620 Hz interrupted at 60 ipm (interruptions per minute) with a 0.5 seconds on/0.5 seconds off temporal pattern. The system reports the presence of precise busy tone after approximately two cycles of this pattern. Nonprecise busy tone is reported after three cycles.

Audible ringback (ring tone) is returned to the calling party to indicate that the called line has been reached and power ringing has started. In the precise tone plan, audible ringback consists of 440 Hz plus 480 Hz with a 2 seconds on/4 seconds off temporal pattern. The system reports the presence of precise audible ringback after two cycles of this pattern.

Outdated equipment in some areas may produce nonprecise, or dirty ringback. Nonprecise ringback is reported after two cycles of a 1 to 2.5 seconds on, 2.5 to 4.5 seconds off pattern of raw energy. The system may report dirty ringback as voice detection, unless voice detection is specifically ignored during this period. The system reports ringback cessation after 3 to 6.5 seconds of silence once ringback has been detected (depending at what point in the ringback cycle the CPA starts listening).

Reorder (Fast Busy) tone indicates that the local switching paths to the calling office or equipment serving the customer are busy or that a toll circuit is not available. In the precise tone plan, reorder consists of 480 Hz plus 620 Hz interrupted at 120 ipm (interruptions per minute) with a 0.25 seconds on/0.25 seconds off temporal pattern. The system reports the presence of precise reorder tone after two cycles of this pattern. Nonprecise reorder tone is reported after three cycles.

Voice detection has multiple uses, and can be used to detect voice as an answer condition, and also to detect machine-generated announcements that may indicate an error condition. Voice presence can be detected after approximately 0.25 to 0.5 seconds of continuous human speech falling within the 200-Hz to 3400-Hz voiceband (although the PSTN only guarantees voice performance between 300 Hz to 800 Hz. A voice cessation condition may be determined, for example, after approximately 0.5 to 1.0 seconds of silence once the presence of voice has been detected.

Special Information Tones (SITs) indicate network conditions encountered in both the Local Exchange Carrier (LEC) and Inter-Exchange Carrier (IXC) networks. The tones alert the caller that a machine-generated announcement follows (this announcement describes the network condition). Each SIT consists of a precise three-tone sequence: the first tone is either 913.8 Hz or 985.2 Hz, the second tone is either 1370.6 Hz or 1428.5 Hz, and the third is always 1776.7 Hz. The duration of the first and second tones can be either 274 ms or 380 ms, while the duration of the third remains a constant 380 ms. The names, descriptions and characteristics of the four most common SITs are summarized in Table 2.

TABLE 2

| Special Information Tones (SITs) | | First Tone Frequency Duration | | Second Tone Frequency Duration | | Third Tone Frequency Duration | |
|---|---|---|---|---|---|---|---|
| Name | Description | (Hz) | (ms) | (Hz) | (ms) | (Hz) | (ms) |
| NC[1] | No circuit found | 985.2 | 380 | 1428.5 | 380 | 1776.7 | 380 |
| IC | Operator intercept | 913.8 | 274 | 1370.6 | 274 | 1776.7 | 380 |
| VC | Vacant circuit (non-registered number) | 985.2 | 380 | 1370.6 | 274 | 1776.7 | 380 |
| RO[1] | Reorder (system busy) | 913.8 | 274 | 1428.5 | 380 | 1776.7 | 380 |

[1]Tone frequencies shown indicate conditions that are the responsibility of the BOC intra-LATA carrier. Conditions occurring on inter-LATA carriers generate SITs with different first and second tone frequencies.

Pager cue tones are used by pager terminal equipment to signal callers or connected equipment to enter the callback number (this number is then transmitted to the paged party). Most pager terminal equipment manufacturers use a 3- or 4-tone burst of 1400 Hz at 100- to 125-ms intervals. The system identifies three cycles of 1400 Hz at these approximate intervals as pager cue tones. To accommodate varying terminal equipment signals, tone bursts of 1400 Hz in a variety of patterns may also be reported as pager cue tones. Voice prompts sometimes accompany pager cue tones to provide instructions. Therefore, combinations of prompts and tones may be detected by configuring an answer supervision template to respond to both voice detection and pager cue tone detection.

A Goertzel filter algorithm may be used to detect the solid tones that begin fax or data-modem calls. If any of the following tones are detected, a "modem" (fax or data) state is indicated: 2100 Hz, 2225 Hz, 1800 Hz, 2250 Hz, 1300 Hz, 1400 Hz, 980 Hz, 1200 Hz, 600 Hz, or 3000 Hz. Fax detection relies on the 1.5 seconds of HDLC flags that precede the answering fax terminal's DIS frame. DIS is used by the answering terminal to declare its capabilities. After a solid tone is detected, a V.21 receiver is used to detect the HDLC flags (01111110) in the preamble of DIS signal on the downstream side. If the required number of flags are detected, fax is reported. Otherwise, upon expiration of a timer, the call is may be determined to be a data modem communication. See, e.g., U.S. Pat. No. 7,003,093, the entirety of which is expressly incorporated herein by reference. See also, U.S. Pat. No. 7,043,006, expressly incorporated herein by reference.

Therefore, a well-developed system exists for in-band signaling over audio channels, with a modest degree of complexity and some variability between standards, which themselves may change over time.

4. Graphics Processing Units

One known digital signal processor architecture, exemplified by the nVidia Tesla™ C870 GPU device, provides a massively multi-threaded architecture, providing over 500 gigaflops peak floating-point performance, and which is typically interfaced with a general-purpose computer through a PCI x16 interface slot on a motherboard. This device encompasses a 128-processor computing core, and is typically provided as a coprocessor on a high-speed bus for a standard personal computer platform. Similarly, the AMD/ATI Firestream 9170 also reports 500 gigaflops performance from a GPU-type device with double precision floating point capability. Likewise, newly described devices (e.g., AMD Fusion) integrate a CPU and GPU on a single die with shared external interfaces.

The nVidia Tesla™ GPU is supported by the Compute Unified Device Architecture (CUDA) software development environment, which provides C language support. Typical applications proposed for the nVidia Tesla™ GPU, supported by CUDA, are Parallel bitonic sort; Matrix multiplication; Matrix transpose; Performance profiling using timers; Parallel prefix sum (scan) of large arrays; Image convolution; 1D DWT using Haar wavelet; OpenGL and Direct3D graphics interoperation examples; Basic Linear Algebra Subroutines; Fast Fourier Transform; Binomial Option Pricing; Black-Scholes Option Pricing; Monte-Carlo Option Pricing; Parallel Mersenne Twister (random number generation); Parallel Histogram; Image Denoising; and a Sobel Edge Detection Filter. Therefore, the typical proposed applications are computer software profiling, matrix applications, image processing applications, financial applications, Seismic simulations; Computational biology; Pattern recognition; Signal processing; and Physical simulation. CUDA technology offers the ability for threads to cooperate when solving a problem. The nVidia Tesla™ GPUs featuring CUDA technology have an on-chip Parallel Data Cache that can store information directly on the GPU, allowing computing threads to instantly share information rather than wait for data from much slower, off-chip DRAMs. Likewise, the software compile aspects of CUDA are able to partition code between the GPU and a host processor, for example to effect data transfers and to execute on the host processor algorithms and code which are incompatible or unsuitable for efficient execution on the GPU itself.

GPU architectures are generally well-suited to address problems that can be expressed as data-parallel computations: the same program is executed on many data elements in parallel, with high arithmetic intensity, the ratio of arithmetic operations to memory operations. Because the same program is executed for each data element, there is a lower requirement for sophisticated flow control; and because it is executed on many data elements and has high arithmetic intensity, the memory access latency can be hidden with calculations instead of big data caches. Thus, the GPU architecture typically provides a larger number of arithmetic logic units than independently and concurrently operable instruction decoders. Data-parallel processing maps data elements to parallel processing threads. Many applications that process large data sets such as arrays can use a data-parallel programming model to speed up the computations. In 3D rendering large sets of pixels and vertices are mapped to parallel threads. Similarly, image and media processing applications such as post-processing of rendered images, video encoding and decoding, image scaling, stereo vision, and pattern recognition can map image blocks and pixels to parallel processing threads. In fact, many algorithms outside the field of image rendering and processing are accelerated by data-parallel processing, from general signal processing or physics simulation to computational finance or computational biology.

While the GPU devices speed up data processing for appropriately selected and defined tasks, typically they are controlled through a general-purpose operating system, and the offload of processed data from the GPU card back to the main processor is not treated as a real-time process. Thus, in a video environment, tasks are sent from the host processor to the GPU, and only if the usable output is fed directly from the GPU system, e.g., the video digital to analog converter (DAC), is the system treated as a real-time processing resource.

The Tesla™ GPU device is implemented as a set of multiprocessors (e.g., 8 on the C870 device), each of which has a Single Instruction, Multiple Data architecture (SIMD): At any given clock cycle, each processor (16 per multiprocessor on the C870) of the multiprocessor executes the same instruction, but operates on different data. Each multiprocessor has on-chip memory of the four following types: One set of local 32-bit registers per processor, a parallel data cache or shared memory that is shared by all the processors and implements the shared memory space, a read-only constant cache that is shared by all the processors and speeds up reads from the constant memory space, which is implemented as a read-only region of device memory, and a read-only texture cache that is shared by all the processors and speeds up reads from the texture memory space, which is implemented as a read-only region of device memory. The local and global memory spaces are implemented as read-write regions of device memory and are not cached. Each multiprocessor accesses the texture cache via a texture unit. A grid of thread blocks is executed on the device by executing one or more blocks on each multiprocessor using time slicing: Each block is split into SIMD groups of threads called warps; each of these warps contains the same number of threads, called the warp size, and is executed by the multiprocessor in a SIMD fashion; a thread scheduler periodically switches from one warp to another to maximize the use of the multiprocessor's computational resources. A half-warp is either the first or second half of a warp. The way a block is split into warps is always the same; each warp contains threads of consecutive, increasing thread IDs with the first warp containing thread 0. A block is processed by only one multiprocessor, so that the shared memory space resides in the on-chip shared memory leading to very fast memory accesses. The multiprocessor's registers are allocated among the threads of the block. If the number of registers used per thread multiplied by the number of threads in the block is greater than the total number of registers per multiprocessor, the block cannot be executed and the corresponding kernel will fail to launch. Several blocks can be processed by the same multiprocessor concurrently by allocating the multiprocessor's registers and shared memory among the blocks. The issue order of the warps within a block is undefined, but their execution can be synchronized, to coordinate global or shared memory accesses. The issue order of the blocks within a grid of thread blocks is undefined and there is no synchronization mechanism between blocks, so threads from two different blocks of the same grid cannot safely communicate with each other through global memory during the execution of the grid.

A new trend seeks to integrate at least one GPU core and at least one CPU core in a single module, such as a single MCM or integrated circuit. This integration permits higher speed intercommunication, lower power consumption, and sharing of higher-level resources, such as cache memory, external bus and memory driver circuitry, and other system elements. Such integration, which encompasses heterogeneous processing core aggregation, also permits parallel processing, speculative execution, and effectively races between different architectures and processing schemes.

5. Telephony Processing Platforms

Telephony control and switching applications have for many years employed general purpose computer operating systems, and indeed the UNIX system was originally developed by Bell Laboratories/AT&T. There are a number of available telephone switch platforms, especially private branch exchange implementations, which use an industry standard PC Server platform, typically with specialized telephony support hardware. These include, for example, Asterisk (from Digium) PBX platform, PBXtra (Fonality), Callweaver, Sangoma, etc. See also, e.g., www.voip-info.org/wiki/. Typically, these support voice over Internet protocol (VOIP) communications, in addition to switched circuit technologies.

As discussed above, typical automated telephone signaling provides in-band signaling which therefore employs acoustic signals. A switching system must respond to these signals, or it is deemed deficient. Typically, an analog or digital call progress tone detector is provided for each channel of a switched circuit system. For VOIP systems, this functionality maybe provided in a gateway (media gateway), either as in traditional switched circuit systems, or as a software process within a digital signal processor.

Because of the computational complexity of the call progress tone analysis task, the density of digital signal processing systems for simultaneously handling a large number of voice communications has been limited. For example, 8 channel call progress tone detection may be supported in a single Texas Instruments TMS320C5510™ digital signal processor (DSP). See, IP PBX Chip from Adaptive Digital Technologies, Inc. (www.adaptivedigital.com/product/solution/ip_pbx.htm). The tone detection algorithms consume, for example, over 1 MIPS per channel for a full suite of detection functions, depending on algorithm, processor architecture, etc. Scaling to hundreds of channels per system is cumbersome, and typically requires special purpose dedicated, and often costly, hardware which occupy a very limited number of expansion bus slots of a PBX system.

Echo cancellation is typically handled near the client (i.e., microphone and speaker); however, in conferencing systems a server-side echo canceller is usually required to obtain good sound quality. Echo cancellation is often discussed with reference to speech signal communication between a "near end" and a "far end". A person speaking at the "far end" of a telephone connection has speech sent over the network to a person listening (and eventually speaking) at the "near end;" a portion of the speech signal received at the near end is retransmitted to the far end, with a delay, resulting in an audible echo.

A typical network echo canceller employs an adaptive digital transversal filter to model the impulse response of the unknown echo channel so that the echo signal can be cancelled. The echo impulse response coefficients used in the transversal filter are updated to track the characteristics of the unknown echo channel. Various algorithms are known, and some are explicitly suited for parallel processing environments. See, e.g., US 20070168408, US 20020064139, U.S. Pat. Nos. 7,155,018, 6,963,649, 6,430,287, PCT/US1998/005854, Gan, W. S. Parallel Implementation of the Frequency Bin Adaptive Filter For Acoustical Echo Cancellation. September 1997, Proceedings of 1997 International Conference on Information, Communications and Signal Processing, IEEE ICICS Volume 2, 9-12 Sep. 1997, pages 754-757; David Qi, "Acoustic Echo Cancellation Algorithms and Implementation on the TMS320C8x", Digital Signal Processing Solutions, Texas Instruments, SPRA063 May 1996, each of which is expressly incorporated herein in its entirety by reference thereto. It is noted that in a conferencing environment, client-side echoes, and line echoes may each be relevant, and a system must be adapted to deal with each. Therefore, it may be desired to handle echoes of in excess of 250 mS, for example 500 mS.

SUMMARY OF THE INVENTION

The present system and method improve the cost and efficiency of real time digital signal processing in a general-purpose computing environment. In particular, one suitable use for the system is performing telephony signal processing functions, in which, for example, a general-purpose computer supports a telephone switching system requiring real-time analysis of multiple voice channels in order to make switching decisions.

In one aspect of the invention, a massively parallel digital signal processor is employed to perform telephony in-band signaling detection and analysis and/or echo cancellation as a coprocessor in a telephony system. In another aspect, a massively parallel coprocessor card is added to a telephony server application which is executed on a standard processor to increase call progress tone detection and/or echo cancellation performance. Advantageously, the massively parallel processor may be adapted to execute standard software, such as C language, and therefore may perform both massively parallel tasks, and possibly serial execution tasks as well. Thus, a telephony system may be implemented on a single processor system, or within a distributed and/or processor/coprocessor architecture.

In a preferred embodiment exemplary of an aspect of the invention, performing call progress tone analysis, data blocks, each including a time slice from a single audio channel, are fed to the massively parallel processor, which performs operations in parallel on a plurality of time slices, generally executing the same instruction on the plurality of time slices. In this subsystem, real time performance may be effectively achieved, with a predetermined maximum processing latency. Further, in a telephone switching environment, the call progress tone analysis task is a limiting factor in achieving acceptable performance, and therefore the telephone switch, including the parallel processor, achieves acceptable performance for the entire telephone switching task. In this case, "real-time" means that the system appropriately processes calls (e.g., inbound and outbound) and in-band call progress tones according to specification.

In some cases, it is not necessary to detect tones on each audio channel continuously, and therefore the system may sample each channel sequentially. In addition, if a Fast Fourier Transform-type (FFT) algorithm is employed, the real (I) and imaginary (Q) channels may each be presented with data from different sources, leading to a doubling of capacity, or even represent qualitatively different high-level processing tasks (which conform to the same FFT criteria). Thus, for example, using an nVidia Tesla™ C870 GPU, with 128 processors, each processor can handle 8 (real only) or 16 (real and imaginary) audio channels, leading to a density of 1024 or 2048 channel call progress tone detection. Practically, the normal operation of the system is below theoretical capacity, to provide "headroom" for other processing tasks and the like, and therefore up to about 800 voice channels may be processed, using a general purpose commercially available coprocessor card for a PC architecture.

For echo cancellation, with a 500 mS capacity and 8.4 kHz sampling rate, about 4200 samples per channel are processed. The processing may, in some cases, be consolidated with the CPT analysis, though a complete separation of these functions is possible. For example, some PC motherboards can host 2 or more PCIe 16× cards, and therefore CPT call be implemented on one card, and echo cancellation (EC) on another. On the other hand, some of the processing is common for CPT and EC, for example an FFT transform. Therefore, the processing may also be combined. Likewise, two (or more) graphics processor boards may be linked through a so-called SLI interface, so that the power of two (or more) GPU devices may be employed in a single coordinated task.

The call progress tone detection coprocessor may, for example, be provided within a telephony server system, implementing a so-called private branch exchange (PBX) or the like.

For example, a PC architecture server may execute Asterisk PBX software under the Linux operating system. A software call is provided from the Asterisk PBX software to a dynamic linked library (DLL), which transfers data from a buffer in main memory containing time slices for the analog channels to be processed. For example, 2 mS each for 800 channels, at an 8.4 kHz sampling rate is provided (132 kB) in the buffer. The buffer contents is transferred to the coprocessor through a PCIe ×16 interface, along with a call to perform an FFT for each channel, with appropriate windowing, and/or using continuity from prior samples. The FFT may then be filtered on the coprocessor, with the results presented to the host processor, or the raw FFT data transferred to the host for filtering. Using a time-to-frequency domain transform, the signal energy at a specified frequency is converted to an amplitude peak at a specific frequency bin, which is readily extracted. Temporal analysis may also be performed in either the coprocessor or processor, though preferably this is performed in the processor. The analysis and data transform may also be used for speech recognition primitives, and for other processes.

A particular advantage of this architecture arises from the suitability of the call progress tone analysis to be performed in parallel, since the algorithm is deterministic and has few or no branch points. Thus, the task is defined to efficiently exploit the processing power and parallelism of a massively parallel processor.

The use of the system and architecture is not limited to telephony. For example, the architecture may be used for music signal processing, such as equalization, mixing, companding, and the like. Various sensor array data, such as sensors to detect fatigue and cracking in infrastructure, may be processed as well. In this later application, a problem may arise that the sensors are sensitive to dynamic and transient events, such as a truck rolling across a bridge, and it is that excitation which provides a signal for analysis. In that case, unless the system processes only a small portion of the data available, it is difficult to archive the unprocessed data which may come from hundreds of sensors (e.g., 500 sensors), each having a frequency response of 1 kHz or more (and thus a sampling rate of 2 kHz or more) with a dynamic range of, for example, 16 bits. In this example, the data throughput is 500×2000×2=2 MB per second, or 7.2 GB per hour, making remote processing unwieldly. After processing, for example to produce a model of the structure, the daily data may be reduced to less than 1 MB, or smaller. That is, the goal of the sensor array is to determine whether the structure is failing, and the raw data merely represents the excitation of the structure which is used to extract model parameters describing the structure. Changes in the model can be interpreted as changes in the structure, which may be innocent, such as snow cover, or insidious, such as stress fracture. Of course, other types of sensors, sensor arrays, or signal sources may also produce massive amounts of data to be processed and reduced, which necessarily requires real-time throughput as available from the present invention. The architecture therefore advantageously provides a signal processor which handles raw signal processing, the results of which may be passed, for example, to a general-purpose processor which can perform a high-level analysis (as required) and general computational tasks, such as communications, mass storage control, human interface functionality, and the like.

Another use of the technology is real time control of complex systems, preferably, but not necessarily those with an array of similar components to be controlled. Thus, for example, a plurality of mechanical or electronic elements may be controlled, and each may be represented with a common model (possibly with different model parameters for each). Likewise, a set of actuators together controlling an interactive system may be controlled. Further, systems with similarly configured control loops, but not necessarily with interactive response, may be implemented. Banks of digital filters, for example, finite impulse response or infinite impulse response, or those with arbitrary topology, may be implemented. In each case, it is preferred that processors within any bank of multiprocessors mostly execute the same operation on data in parallel, though in some cases, this is not a hard limit of operation, and the broad parallelism may be sacrificed to process data separately. In some cases, there may be interactivity between the processing by a plurality of processors within a multiprocessor, or between data processed by different multiprocessors.

In another embodiment, a real system is implemented which specifically exploits the architecture of the real time parallel processor. Thus, for example if there are 128 processes arranged in 8 sets of 16 processors, then a rectangular actuator and/or sensor array of these dimensions are implemented, with each processor handling a single actuator and/or sensor of the 8×16 array. Likewise, if there are distortions or symmetries which make the anticipated processing for some sets of actuators and/or sensors more alike than others, these can be group together under a single multiprocessor. According to this same strategy, in some cases, control over an actuator and/or sensor may be dynamically assigned to different processors based on a similarity of the processing task. Further, the system may be implemented such that actuators and/or sensors are dynamically grouped based on an acceptability of identical algorithm execution (with possible exceptions), with or without post-correction of results. This may, in some cases, lead to a dithering, that is, an oscillation about a desired response, which may be tolerated, or later filtered.

The system and method may be used for processing supporting spatial arrays, for example antenna arrays. One preferred embodiment provides a dynamically adaptive synthetic aperture antenna in which each element of an array has, for example, a dynamically controllable gain and delay. If the elements of such an array have a large near-field pattern, a predetermined set of control parameters would be suboptimal, since the antenna will respond to dielectric elements within its near field. Therefore, in accordance with the present invention, the sets of parameters may be adaptively controlled to account for distortion and the like. Further, in some cases, transmit and receive antennas may be interactive, and thus require appropriate processing. In other cases, the performance of the antenna may be sensitive to the data transmitted or other aspects of the waveform, and the processing array can be used to shape the transmitted signal to "predistort" the output for each element (or groups of elements), or to adapted the elements based on the transmitted or received signal characteristics.

In general, the processing architecture advantageously performs transforms on parallel data sets, which can then be filtered or simply processed as may be appropriate to yield a desired output. In some cases, the transformed signals are transformed at least twice, for example a transform and an inverse transform. In some cases, the transforms are Fourier and inverse Fourier transforms, though many other types of transformation are possible. A key feature of typical transforms is that the processing instructions and sequence is not data dependent, permitting a multiprocessor architecture to efficiently process many data streams in parallel. However, even in cases where there is a data dependency, such an architecture may provide advantages.

In cases where a set of heterogeneous cores are integrated, which access a common memory pool, a first type of processor may be employed to transform data in a data-dependent fashion, and a second processor may be employed to process the transformed data in a data-dependent fashion. For example, the data-dependent processor may be employed to make individual decisions regarding signal states, while the data-independent processor may be employed for filtering and orthogonalization of data representations.

DETAILED DESCRIPTION OF THE PREFERRED EMBODIMENTS

Figure 1:
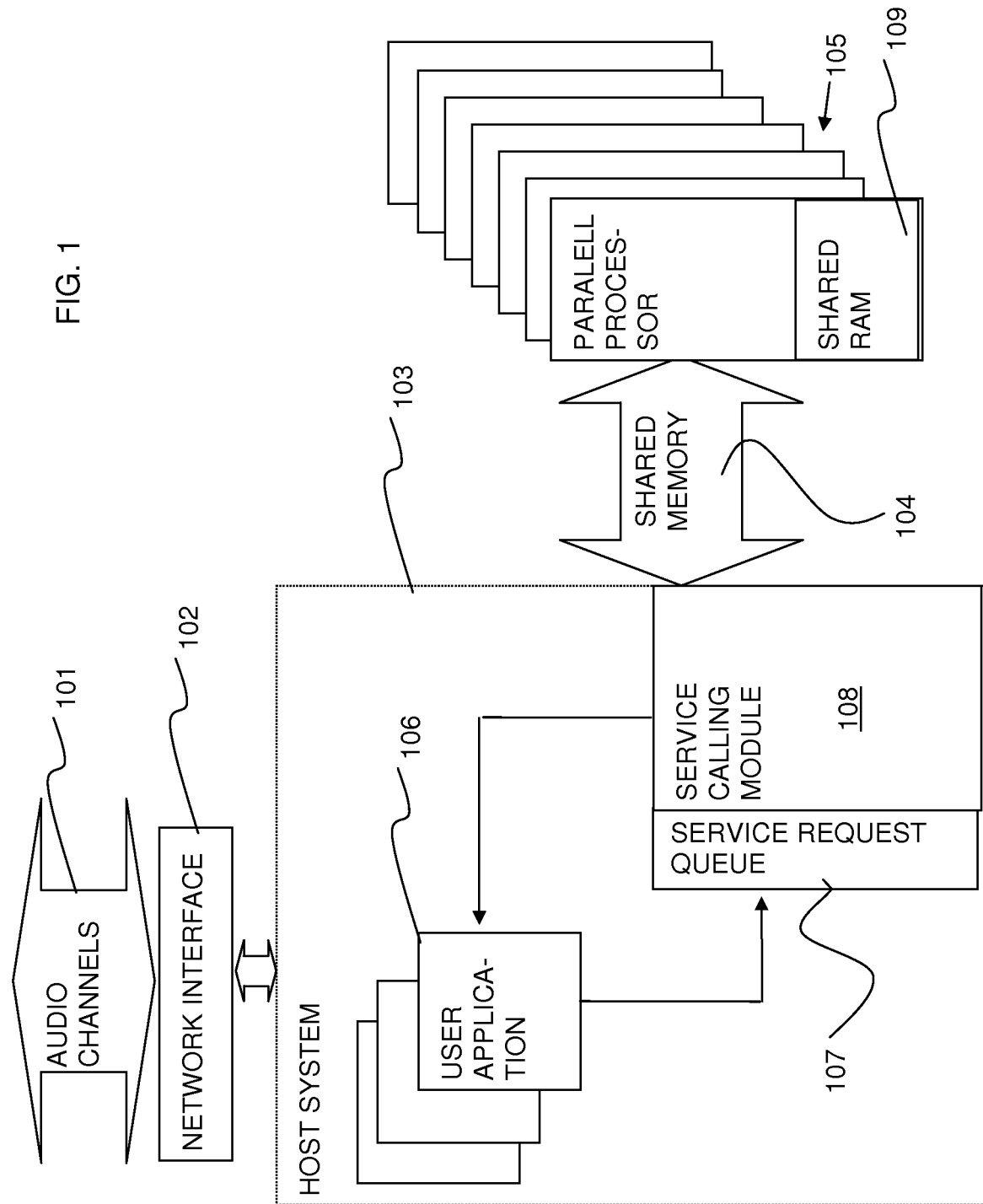
FIG. 1 is a schematic diagram of a system for implementing the invention.

One embodiment of the present invention provides a system and method for analyzing call progress tones and performing other types of audio band processing on a plurality of voice channels, for example in a telephone system. Examples of call progress tone analysis can be found at:

www.commetrex•com/products/algorithms/CPA.html;

www.dialogic•com/network/csp/appnots/10117_CPA_SR6_HMP2.pdf;

whitepapers.zdnet.co-uk/0,1000000651,260123088p,00.htm; and www.pikatechnologies•com/downloads/samples/readme/6.2%20-%20Call %20Progress %20Analysis %20-%20ReadMe.txt.

In a modest size system for analyzing call progress tones, there may be hundreds of voice channels to be handled are simultaneously. Indeed, the availability of a general-purpose call progress tone processing system permits systems to define non-standard or additional signaling capabilities, thus reducing the need for out of band signaling. Voice processing systems generally require real time performance; that is, connections must be maintained and packets or streams forwarded within narrow time windows, and call progress tones processed within tight specifications.

An emerging class of telephone communication processing system, implements a private branch exchange (PBX) switch, which employs a standard personal computer (PC) as a system processor, and employs software which executes on a general-purpose operating system (OS). For example, the Asterisk system runs on the Linux OS. More information about Asterisk may be found at Digium/Asterisk, 445 Jan Davis Drive NW, Huntsville, Ala. 35806, 256.428.6000 asterisk.org/downloads. Another such system is: "Yate" (Yet Another Telephony Engine), available from Bd. Nicolae Titulescu 10, Bl. 20, Sc. C, Ap. 128 Sector 1, Bucharest, Romania yate.null.ro/pmwiki/index.php?n=Main.Download.

In such systems, scalability to desired levels, for example hundreds of simultaneous voice channels, requires that the host processor have sufficient headroom to perform all required tasks within the time allotted. Alternately stated, the tasks performed by the host processor should be limited to those it is capable of completing without contention or undue delay. Because digitized audio signal processing is resource intensive, PC-based systems have typically not implemented functionality, which requires per-channel signal processing, or offloaded the processing to specialized digital signal processing (DSP) boards. Further, such DSP boards are themselves limited, for example 8-16 voice processed channels per DSP core, with 4-32 cores per board, although higher density boards are available. These boards are relatively expensive, as compared to the general-purpose PC, and occupy a limited number of bus expansion slots.

The present invention provides an alternate to the use of specialized DSP processors dedicated to voice channel processing. According to one embodiment, a massively parallel processor as available in a modern video graphics processor (though not necessarily configured as such) is employed to perform certain audio channel processing tasks, providing substantial capacity and versatility. One example of such a video graphics processor is the nVidia Tesla™ GPU, using the CUDA software development platform ("GPU"). This system provides 8 banks of 16 processors (128 processors total), each processor capable of handling a real-time fast Fourier transform (FFT) on 8-16 channels. For example, the FFT algorithm facilitates subsequent processing to detect call progress tones, which may be detected in the massively parallel processor environment, or using the host processor after downloading the FFT data. One particularly advantageous characteristic of implementation of a general purpose FFT algorithm rather than specific call tone detection algorithms is that a number of different call tone standards (and extensions/variants thereof) may be supported, and the FFT data may be used for a number of different purposes, for example speech recognition, etc.

Likewise, the signal processing is not limited to FFT algorithms, and therefore other algorithms may also or alternately be performed. For example, wavelet-based algorithms may provide useful information.

The architecture of the system provides a dynamic link library (DLL) available for calls from the telephony control software, e.g., Asterisk. An application programming interface (API) provides communication between the telephony control software (TCS) and the DLL. This TCS is either unmodified or minimally modified to support the enhanced functionality, which is separately compartmentalized.

The TCS, for example, executes a process which calls the DLL, causing the DLL to transfer a data from a buffer holding, e.g., 2 mS of voice data for, e.g., 800 voice channels, from main system memory of the PC to the massively parallel coprocessor (MPC), which is, for example an nVidia Tesla™ platform. The DLL has previously uploaded to the MPC the algorithm, which is, for example, a parallel FFT algorithm, which operates on all 800 channels simultaneously. It may, for example, also perform tone detection, and produce an output in the MPC memory of the FFT-representation of the 800 voice channels, and possibly certain processed information and flags. The DLL then transfers the information from the MPC memory to PC main memory for access by the TCS, or other processes, after completion.

While the MPC has massive computational power, it has somewhat limited controllability. For example, a bank of 16 DSPs in the MPC are controlled by a single instruction pointer, meaning that the algorithms executing within the MPC are generally not data-dependent in execution, nor have conditional-contingent branching, since this would require each thread to execute different instructions, and thus dramatically reduce throughput. Therefore, the algorithms are preferably designed to avoid such processes, and should generally be deterministic and non-data dependent algorithms. On the other hand, it is possible to perform contingent or data-dependent processing, though the gains from the massively parallel architecture are limited, and thus channel specific processing is possible. Advantageously, implementations of the FFT algorithm are employed which meet the requirements for massively parallel execution. For example, the CUDA™ technology environment from nVidia provides such algorithms. Likewise, post processing of the FFT data to determine the presence of tones poses a limited burden on the processor(s), and need not be performed under massively parallel conditions. This tone extraction process may therefore be performed on the MPC or the host PC processor, depending on respective processing loads and headroom.

In general, the FFT itself should be performed in faster-than real-time manner. For example, it may be desired to implement overlapping FFTs, e.g., examining 2 mS of data every 1 mS, including memory-to-memory transfers and associated processing. Thus, for example, it may be desired to complete the FFT of 2 mS of data on the MPC within 0.5 mS. Assuming, for example, a sampling rate of 8.4 kHz, and an upper frequency within a channel of 3.2-4 kHz, the 2 mS sample, would generally imply a 256-point FFT, which can be performed efficiently and quickly on the nVidia Tesla™ platform, including any required windowing and post processing.

Therefore, the use of the present invention permits the addition of call progress tone processing and other per channel signal processing tasks to a PC based TCS platform without substantially increasing the processing burden on the host PC processor, and generally permits such a platform to add generic call progress tone processing features and other per channel signal processing features without substantially limiting scalability.

Other sorts of parallel real time processing are also possible, for example analysis of distributed sensor signals such as "Motes" or the like. See, en.wikipedia•org/wiki/Smartdust. The MPC may also be employed to perform other telephony tasks, such as echo cancellation, conferencing, tone generation, compression/decompression, caller ID, interactive voice response, voicemail, packet processing and packet loss recovery algorithms, etc.

Similarly, simultaneous voice recognition can be performed on hundreds of simultaneous channels, for instance in the context of directing incoming calls based on customer responses at a customer service center. Advantageously, in such an environment, processing of particular channels maybe switched between banks of multiprocessors, depending on the processing task required for the channel and the instructions being executed by the multiprocessor. Thus, to the extent that the processing of a channel is data dependent, but the algorithm has a limited number of different paths based on the data, the MPC system may efficiently process the channels even where the processing sequence and instructions for each channel is not identical.

FIG. 1 shows a schematic of system for implementing the invention.

Massively multiplexed voice data 101 is received at network interface 102. The network could be a LAN, Wide Area Network (WAN), Prime Rate ISDN (PRI), a traditional telephone network with Time Division Multiplexing (TDM), or any other suitable network. This data may typically include hundreds of channels, each carrying a separate conversation and also routing information. The routing information may be in the form of in-band signaling of dual frequency (DTMF) audio tones received from a telephone keypad or DTMF generator. The channels may be encoded using digital sampling of the audio input prior to multiplexing. Typically voice channels will come in 20 ms frames.

The system according to a preferred coprocessor embodiment includes at least one host processor 103, which may be programmed with telephony software such as Asterisk or Yate, cited above. The host processor may be of any suitable type, such as those found in PCs, for example Intel Pentium Core 2 Duo or Quadra, or AMD Athlon X2. The host processor communicates via shared memory 104 with MPC 105, which is, for example 2 GB or more of DDR2 or DDR3 memory.

Within the host processor, application programs 106 receive demultiplexed voice data from interface•102, and generate service requests for services that cannot or are desired not to be processed in real time within the host processor itself. These service requests are stored in a service request queue 107. A service calling module 108 organizes the service requests from the queue 107 for presentation to the MPC 105.

The module 108 also reports results back to the user applications 106, which in turn put processed voice data frames back on the channels in real time, such that the next set of frames coming in on the channels 101 can be processed as they arrive.

Figure 2:
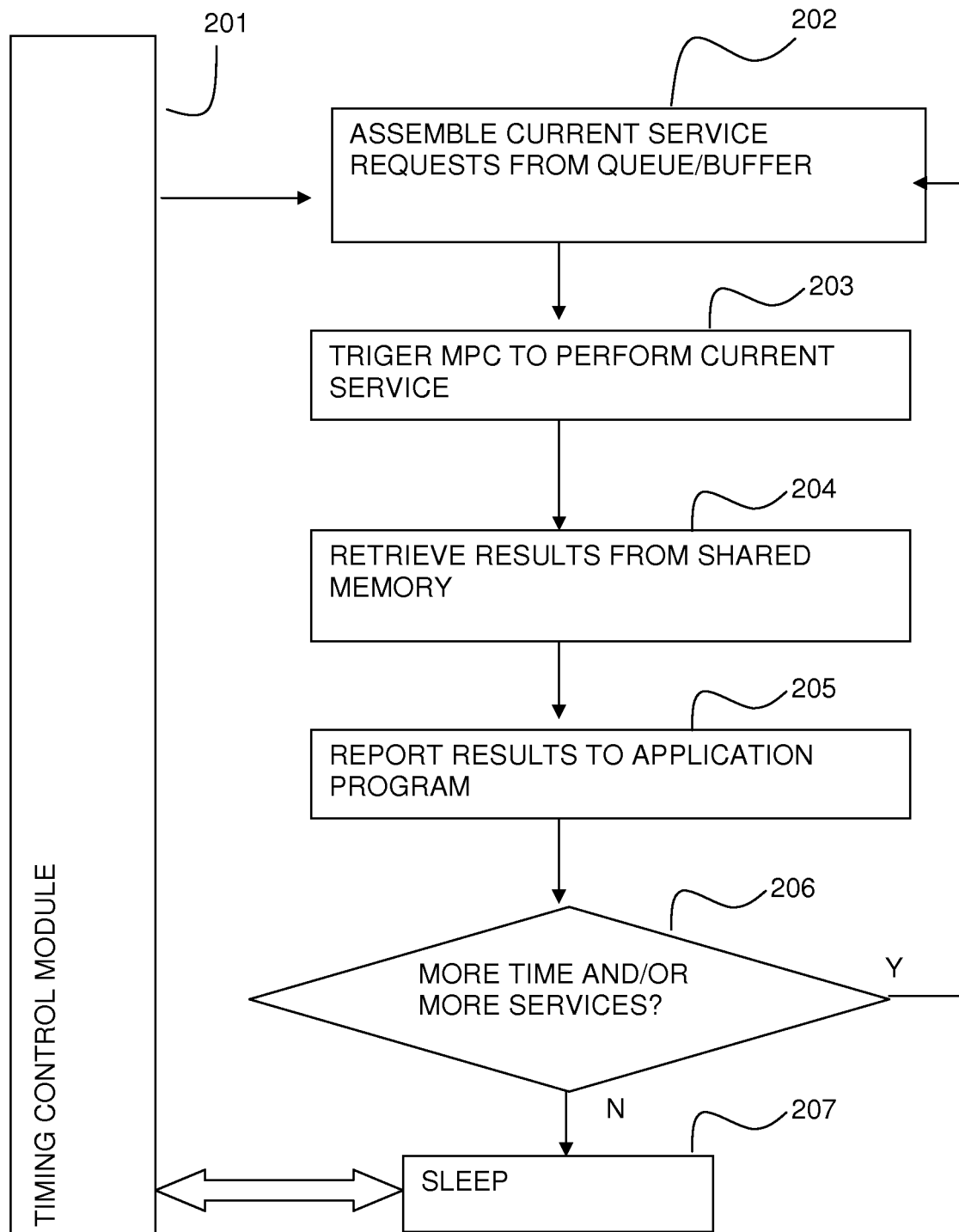
FIG. 2 is a flowchart of operations within a host processor
Figure 3:
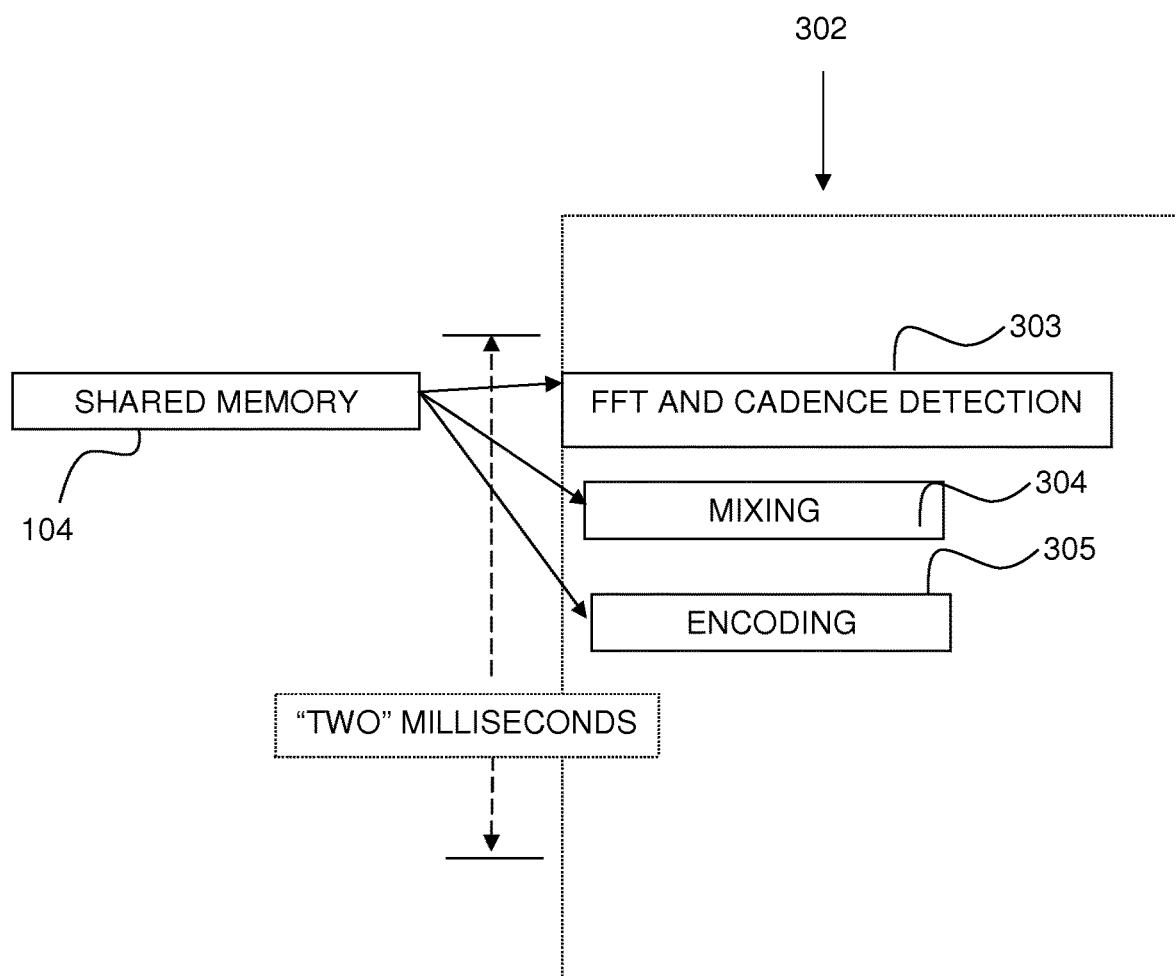
FIG. 3 is a schematic diagram showing operations with respect to a massively parallel coprocessor.

FIG. 2 shows a process within module 108. In this process, a timing module 201 keeps track of a predetermined real time delay constraint. Since standard voice frames are 20 ms long, this constraint should be significantly less than that to allow operations to be completed in real time. A 5-10 ms delay would very likely be sufficient; however, a 2 ms delay would give a degree of comfort that real time operation will be assured. Then, at 202, e blocks of data requesting service are organized into the queue or buffer. At 203, the service calling module examines the queue to see what services are currently required. Some MPC's, such as the nVidia Tesla™ C870 GPU, require that each processor within a multiprocessor of the MPC perform the same operations in lockstep. For such MPC's, it will be necessary to choose all requests for the same service at the same time. For instance, all requests for an FFT should be grouped together and requested at once. Then all requests for a Mix operation might be grouped together and requested after the FFT's are completed—and so forth. The MPC 105 will perform the services requested and provide the results returned to shared memory 104. At 204, the service calling module will retrieve the results from shared memory and at 205 will report the results back to the application program. At 206, it is tested whether there is more time and whether more services are requested. If so, control returns to element 202. If not, at 207, the MPC is triggered to sleep (or be available to other processes) until another time interval determined by the real time delay constraint is begun, FIG. 3 shows an example of running several processes on data retrieved from the audio channels. The figure shows the shared memory 104 and one of the processors 302 from the MPC 105. The processor 302 first retrieves one or more blocks from the job queue or buffer 104 that are requesting an FFT and performs the FFT on those blocks. The other processors within the same multiprocessor array of parallel processors are instructed to do the same thing at the same time (on different data). After completion of the FFT, more operations can be performed. For instance, at 304 and 305, the processor 302 checks shared memory 104 to see whether more services are needed. In the examples given, mixing 304 and decoding 305 are requested by module 109, sequentially. Therefore, these operations are also performed on data blocks retrieved from the shared memory 104. The result or results of each operation are placed in shared memory upon completion of the operation, where those results are retrievable by the host processor.

In the case of call progress tones, these three operations together: FFT, mixing, and decoding, will determine the destination of a call associated with the block of audio data for the purposes of telephone switching.

If module 108 sends more request for a particular service than can be accommodated at once, some of the requests will be accumulated in a shared RAM 109 to be completed in a later processing cycle. The MPC will be able to perform multiple instances of the requested service within the time constraints imposed by the loop of FIG. 2. Various tasks may be assigned priorities, or deadlines, and therefore the processing of different services may be selected for processing based on these criteria, and need not be processed in strict order.

The following is some pseudo code illustrating embodiments of the invention as implemented in software. The disclosure of a software embodiment does not preclude the possibility that the invention might be implemented in hardware.

Embodiment #1

Data Structures to be Used by Module 108
RQueueType Structure // Job Request Queue
  ServiceType
  ChannelID // Channel Identifier
  VoiceData // Input Data
  Output // Output Data
End Structure
// This embodiment uses a separate queue for each type of service to be requested.
// The queues have 200 elements in them. This number is arbitrary and could be adjusted
// by the designer depending on anticipated call volumes and numbers of processors available
// on the MPC. Generally, the number does not have to be as large as the total of number
// of simultaneous calls anticipated, because not all of those calls will be requesting services
// at the same time.
RQueueType RQueueFFT[200] // Maximum of 200 Requests FFT
RQueueType RQueueMIX[200] // Maximum of 200 Requests MIX
RQueueType RQueueENC[200] // Maximum of 200 Requests ENC
RQueueType RQueueDEC[200] // Maximum of 200 Requests DEC
Procedures to be Used by Module 108
// Initialization Function
Init: Initialize Request Queue
  Initialize Service Entry
  Start Service Poll Loop
// Service Request Function
ReqS: Case ServiceType
  FFT: Lock RQueueFFT
  Insert Service Information into RQueueFFT
  Unlock RQueueFFT
  MIX: Lock RQueueMIX
  Insert Service Information into RQueueMIX
  Unlock RQueueMIX
  ENC: Lock RQueueENC
  Insert Service Information into RQueueENC
  Unlock RQueueENC
  DEC: Lock RQueueDEC
  Insert Service Information into RQueueDEC
  Unlock RQueueDEC
  End Case
  Wait for completion of Service
  Return output
// Service Poll Loop
// This loop is not called by the other procedures. It runs independently. It will keep track of
// where the parallel processors are in their processing. The host will load all the requests for a
// particular service into the buffer. Then, it will keep track of when the services are completed
// and load new requests into the buffer.
//
SerPL: Get timestamp and store in St
  // Let's do FFT/FHT
  Submit RQueueFFT with FFT code to GPU
  For all element in RQueueFFT
  Signal Channel of completion of service
  End For
  // Let's do mixing
  Submit RQueueMIX with MIXING code to GPU
  For all element in RQueueMIX
  Signal Channel of completion of service
  End For
  // Let's do encoding
  Submit RQueueENC with ENCODING code to GPU
  For all element in RQueueENC

```
  Signal Channel of completion of service
  End For
  // Let's do decoding
  Submit RQueueDEC with DECODING code to GPU
  For all element in RQueueDEC
    Signal Channel of completion of service
  End For
  // Make sure it takes the same amount of time for every pass
  Compute time difference between now and St
  Sleep that amount of time
  Goto SerPL // second pass
Examples of Code in Application Programs 106 for Calling the Routines Above
Example for Calling "Init"
    // we have to initialize PStar before we can use it
    Call Init
Example for Requesting an FFT
    // use FFT service for multitone detection
    Allocate RD as RQueueType
    RD.Service=FFT
    RD.ChannelID=Current Channel ID
    RD.Input=Voice Data
    Call ReqS(RD)
    Scan RD.Output for presence of our tones
Example for Requesting Encoding
    // use Encoding service
    Allocate RD as RQueueType
    RD.Service=ENCODE
    RD.ChannelID=Current Channel ID
    RD.Input=Voice Data
    Call ReqS(RD)
    // RD.Output contains encoded/compressed data
Example for Requesting Decoding
    // use Decoding service
    Allocate RD as RQueueType
    RD.Service=DECODE
    RD.ChannelID=Current Channel ID
    RD.Input=Voice Data
    Call ReqS(RD)
    // RD.Output contains decoded data Embodiment #2

// This embodiment is slower, but also uses less memory than embodiment #1 above
Data Structures to be Used by Module 108
RQueueType Structure // Job Request Queue
    ServiceType
    ChannelID // Channel Identifier
    VoiceData // Input Data
    Output // Output Data
End Structure
// This embodiment uses a single queue, but stores other data in a temporary queue
// when the single queue is not available. This is less memory intensive, but slower.
RQueueType RQueue[200]
    // Maximum of 200 Requests
Procedures to be Used by Module 108
// Initialization Function
Init: Initialize Request Queue
    Initialize Service Entry
    Start Service Poll Loop
// Service Request Function
ReqS: Lock RQueue
    Insert Service Information into RQueue
    Unlock RQueue
    Wait for completion of Service
    Return output
// Service Poll Loop
// to run continuously
SerPL: Get timestamp and store in St
    // Let's do FFT/FHT
    For all element in RQueue where SerivceType=FFT
      Copy Data To TempRQueue
    End For
    Submit TempRQueue with FFT code to GPU
    For all element in TempRQueue
      Move TempRQueue.output to RQueue.output
      Signal Channel of completion of service
    End For
    // Let's do mixing
    For all element in RQueue where SerivceType=MIXING
      Copy Data To TempRQueue
    End For
    Submit TempRQueue with MIXING code to GPU
    For all element in RQueue
      Move TempRQueue.output to RQueue.output
      Signal Channel of completion of service
    End For
    // Let's do encoding
    For all element in RQueue where SerivceType=ENCODE
      Copy Data To TempRQueue
    End For
    Submit TempRQueue with ENCODING code to GPU
    For all element in RQueue
      Move TempRQueue.output to RQueue.output
      Signal Channel of completion of service
    End For
    // Let's do decoding
    For all element in RQueue where SerivceType=DECODE
      Copy Data To TempRQueue
    End For
    Submit TempRQueue with DECODING code to GPU
    For all element in RQueue
      Move TempRQueue.output to RQueue.output
      Signal Channel of completion of service
    End For
    // Make sure it takes the same amount of time for every pass
    Compute time difference between now and St
    Sleep that amount of time
    Goto SerPL // second pass
Examples of Code in the Application Programs 106 for Calling the Routines Above
Example for Calling "Init"
    // we have to initialize PStar before we can use it
    Call Init
Example for Calling "FFT"
    // use FFT service for multitone detection
    Allocate RD as RQueueType
    RD.Service=FFT
    RD.ChannelID=Current Channel ID
    RD.Input=Voice Data
    Call ReqS(RD)
    Scan RD.Output for presents of our tones
Example for Calling Encoding
    // use Encoding service
    Allocate RD as RQueueType
    RD.Service=ENCODE
    RD.ChannelID=Current Channel ID
    RD.Input=Voice Data
    Call ReqS(RD)
```

```
// RD.Output contains encoded/compressed data
Example for Calling Decoding
    // use Decoding service
    Allocate RD as RQueueType
    RD.Service=DECODE
    RD.ChannelID=Current Channel ID
    RD.Input=Voice Data
    Call ReqS(RD)
    // RD.Output contains decoded data
```

While the embodiment discussed above uses a separate host and massively parallel processing array, it is clear that the processing array may also execute general purpose code and support general purpose or application-specific operating systems, albeit with reduced efficiency as compared to an unbranched signal processing algorithm. Therefore, it is possible to employ a single processor core and memory pool, thus reducing system cost and simplifying system architecture. Indeed, one or more multiprocessors may be dedicated to signal processing, and other(s) to system control, coordination, and logical analysis and execution. In such a case, the functions identified above as being performed in the host processor would be performed in the array, and, of course, the transfers across the bus separating the two would not be required.

The present invention may be applied to various parallel data processing algorithms for independent or interrelated data streams. For example, telephone conversions, sensor arrays, communications from computer network components, image processing, tracking of multiple objects within a space, object recognition in complex media or multimedia, and the like.

One particular advantage of the present architecture is that it facilitates high level interaction of multiple data streams and data fusion. Thus, for example, in a telephone environment, the extracted call progress tones may be used by a call center management system to control workflows, scheduling, pacing, monitoring, training, voice stress analysis, and the like, which involve an interaction of a large number of concurrent data streams which are each nominally independent. On the other hand, in a seismic data processor, there will typically be large noise signals imposed on many sensors, which must be both individually processed and processor for correlations and significant events. Therefore, another advantage of the integration of the real time parallel data processing and analysis within a computing platform, that supports a general purpose (typically non-real time) operating system, is that a high level of complex control may be provided based on the massive data flows through the real-time subsystem, within an integrated platform, and often without large expense, using available computational capacity efficiently.

From a review of the present disclosure, other modifications will be apparent to persons skilled in the art. Such modifications may involve other features which are already known in the design, manufacture and use of telephony engines and parallel processing and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. The word "or" should be construed as an inclusive or, in other words as "and/or".

What is claimed is:

1. A parallel signal processing system, comprising:
    at least one input port configured to receive a plurality of streams of information over time;
    a memory configured to store data representing a time period of the plurality of streams of information over time;
    a single instruction, multiple data type parallel processor, configured to:
        receive the data representing the time period of the plurality of streams of information over time;
        process the received data for each respective stream of information over time to produce a result selectively in dependent on at least one of a transform, a convolution, an echo processing and a transversal filtering; and
        process the data representing the time period of the plurality of streams of information over time to produce the result for a respective stream of information over time comprising in-band signal analysis; and
    storing the result in the memory.

2. The parallel signal processing system according to claim 1, wherein the plurality of streams of information over time are independent of each other.

3. The parallel signal processing system according to claim 1, wherein at least two of the plurality of streams of information over time are related to each other.

4. The parallel signal processing system according to claim 1, wherein the single instruction, multiple data type parallel processor is configured to process the received data representing the time period for a respective stream of information over time, dependent on at least one other respective stream of information of the plurality of streams of information over time.

5. The parallel signal processing system according to claim 1, wherein the single instruction, multiple data type parallel processor is configured to process the data representing the time period of the plurality of streams of information over time to produce the result for a respective stream of information over time which is independent of others of the plurality of streams of information over time.

6. The parallel signal processing system according to claim 1, wherein the single instruction, multiple data type parallel processor is configured to process the data representing the time period of the plurality of streams of information over time to produce the result for a respective stream of information over time which comprises a convolution.

7. The parallel signal processing system according to claim 1, wherein the single instruction, multiple data type parallel processor is configured to process the data representing the time period of the plurality of streams of information over time to produce the result for a respective stream of information over time comprising a transversal filtering.

8. The parallel signal processing system according to claim 1, wherein the single instruction, multiple data type parallel processor is configured to process the data representing the time period of the plurality of streams of information over time to produce the result for a respective stream of information over time comprising a time-frequency domain transform.

9. The parallel signal processing system according to claim 1, wherein the single instruction, multiple data type parallel processor is configured to process the data representing the time period of the plurality of streams of information over time to produce the result for a respective stream of information over time comprising a wavelet transform.

10. The parallel signal processing system according to claim 1, wherein the single instruction, multiple data type parallel processor is configured to process the data representing the time period of the plurality of streams of information over time to produce the result for a respective stream of information over time comprising echo processing.

11. The parallel signal processing system according to claim 1, wherein the single instruction, multiple data type parallel processor is configured to process the data representing the time period of the plurality of streams of information over time to produce the result for a respective stream of information over time comprising speech recognition processing.

12. The parallel signal processing system according to claim 1, wherein the single instruction, multiple data type parallel processor is configured to concurrently execute a common set of instructions for each time period substantially without data-dependent conditional execution branch instructions.

13. A nontransitory computer readable medium, storing therein instructions for controlling a programmable processor to perform a method comprising:
   a step for storing data representing a time period of a plurality of streams of information over time in a memory;
   a step for controlling a single instruction, multiple data type parallel processor to receive and process the data representing the time period of the plurality of streams of information over time;
   a step for controlling the single instruction, multiple data type parallel processor to produce a result selectively in dependent thereon, wherein the process comprises at least one of a transform, a convolution, echo processing and a transversal filtering;
   a step for controlling the single instruction, multiple data type parallel processor to process the data representing the time period of the plurality of streams of information over time to produce the result for a respective stream of information over time comprising in-band signal analysis; and
   a step for storing the result in the memory.

14. The computer readable medium according to claim 13, wherein at least one of the plurality of streams of information and the result for each processed streams of information are independent of each other.

15. The computer readable medium according to claim 13, wherein at least one of the plurality of streams of information over time or at least one of the results are dependent on at least one other of the plurality of streams of information over time or at least one of the results.

16. The computer readable medium according to claim 13, wherein the result comprises speech recognition processing.

17. A parallel signal processing method comprising:
   storing data representing a time period of a plurality of streams of information over time in a memory;
   receiving the data representing the time period of the plurality of streams of information over time from the memory;
   selectively processing the retrieved data representing the time period of the plurality of streams of information over time with a single instruction, multiple data type parallel processor comprising at least one of a transform, a convolution, echo processing and a transversal filtering;
   selectively processing the retrieved data representing the time period of the plurality of streams of information over time with a single instruction, multiple data type parallel processor comprising in-band signal analysis; and
   storing the result in the memory.

18. The parallel signal processing method according to claim 17, wherein said selectively processing comprises performing at least one speech recognition function.

19. The parallel signal processing method according to claim 17, wherein said selectively processing comprises performing echo processing.

20. The parallel signal processing method according to claim 17, wherein the in-band signal analysis comprises call progress tone detection.

* * * * *